( 12 ) United States Patent
Usui et al.

(10) Patent No.: US 6,738,168 B1
(45) Date of Patent: May 18, 2004

(54) METHOD AND APPARATUS FOR REPRODUCING COLOR PRINTER OUTPUT, AND COMPUTER-READABLE RECORDING MEDIUM STORING COLOR-PRINTER-OUTPUT REPRODUCING PROGRAM

(75) Inventors: Nobuaki Usui, Kawasaki (JP); Jun-ichi Odagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 838 days.

(21) Appl. No.: 09/627,455

(22) Filed: Jul. 27, 2000

(30) Foreign Application Priority Data

Oct. 29, 1999 (JP) ............................................. 11-308970

(51) Int. Cl.⁷ .............................. G03F 3/08; G06F 3/12; G06K 15/02
(52) U.S. Cl. ...................... 358/520; 358/518; 358/515; 358/504; 358/500; 358/502; 382/162; 382/167
(58) Field of Search ................................. 358/504, 518, 358/515, 520; 715/526, 528; 347/115, 188, 900; 348/180, 181, 182, 183, 184, 185, 186, 187, 188, 189, 190, 191, 192, 193, 194; 345/582, 473; 382/162–163, 164, 165–168

(56) References Cited

U.S. PATENT DOCUMENTS

| 5,172,224 A | * | 12/1992 | Collette et al. | ............ | 358/515 |
| 5,309,257 A | * | 5/1994 | Bonino et al. | ............ | 358/504 |
| 5,313,291 A | * | 5/1994 | Appel et al. | ............ | 358/501 |
| 5,459,678 A | * | 10/1995 | Feasey | ............ | 358/518 |
| 5,696,593 A | * | 12/1997 | Chiba et al. | ............ | 358/296 |

FOREIGN PATENT DOCUMENTS

| JP | 07-234158 | 9/1995 |
| JP | 10-73487 | 3/1998 |
| JP | 10-73488 | 3/1998 |
| JP | 10-73489 | 3/1998 |
| JP | 11-132850 | 5/1999 |

* cited by examiner

Primary Examiner—Edward Coles
Assistant Examiner—David Jones
(74) Attorney, Agent, or Firm—Armstrong, Kratz, Quintos, Hanson & Brooks, LLP

(57) ABSTRACT

A technology of matching the real output color of a color printer with the color to be reproduced on a monitor by estimating spectral reflectivities precisely with consideration of an optical phenomenon peculiar to the color printer output. A coefficient calculating section calculates coefficients representing color characteristics of the color printer output and concerning the respective spectral reflectivities of 3 reference color chips for a side, which is neither a side where the dot-area percentage of black is 100% nor a side representing black gradation, based on the spectral reflectivities of the color chips. A spectral reflectivity calculating section calculates a spectral reflectivity corresponding to an arbitrary dot-area percentage on the side, based on the coefficients calculated by the coefficient calculating section, and in the meantime calculates a spectral reflectivity corresponding to an arbitrary dot-area percentage on the side where the dot-area percentage of black is 100%, based on the spectral reflectivities of the color chips. This technology is useful in reproducing the output of an electrophotographic color printer on a monitor, such as CRT, LCD or PDP.

15 Claims, 11 Drawing Sheets

FIG. 9 MAGENTA 0-100% ONLY

METHOD AND APPARATUS FOR REPRODUCING COLOR PRINTER OUTPUT, AND COMPUTER-READABLE RECORDING MEDIUM STORING COLOR-PRINTER-OUTPUT REPRODUCING PROGRAM

BACKGROUND OF THE INVENTION

1. Field of the Invention

The present invention relates to a method of and an apparatus for reproducing on a monitor, such as a CRT (cathode-ray tube), an LCD (liquid crystal display) or a PDP (plasma display panel), colors of the output of a color printer as of electrophotography, and also to a computer-readable recording medium storing a color-printer-output reproducing program.

2. Description of the Related Art

Generally, because a color printer and a monitor are quite different from each other in color expressing method, it is essential to convert color signals (color signals as of YMCK) for the color printer into those (color signals as of RGB) for the monitor in order to express the same color as the output of the color printer. It has been customary that such conversion is performed by measuring a given color chip, which is previously set for the color printer, to obtain a standard space value, such as CIEXYZ(1931) or CIELAB, and then utilizing a correlation between the standard space value and the color signal for the monitor.

The conventional method for reproducing the color printer output on a monitor is exemplified by the following:

(a) Method using Neugebauer's formula:

Neugebauer's formula is to be used in determining values of the individual color components of R, G, B from the dot-area percentage (value to be designated by a color signal) of four color pigments of yellow (Y), magenta (M), cyan (C) and black (K) In this method, a weighted average for values of color measurement of 16 kinds of color chips is calculated using the products of values of arbitrary color components of Y, M, C, K as weighting coefficients. The method is popular in the printing field and is known to have encountered with a problem that, especially in color printing, it is impossible to match the result of real printing with the color to be reproduced on a monitor, as the method is simple but is suitable to use only in ideal condition. Many modifications of the method have been proposed to eliminate the above-mentioned problem; but no successful result has been found.

(b) Method disclosed in Japanese Patent Laid-Open Publications Nos. HEI 10-73487, 10-73488 and 10-73489:

This method is to be used for printed entity (thing printed in ink having transparency). In this method, using spectral reflectivities for 352 color chips, a target spectral reflectivity is calculated by reducing the number of dimensions successively like first from a 4-dimensional color solid (4-dimensional color space) to a 3-dimensional color solid (3-dimensional color space) and then from the 3-dimensional color solid to a 2-dimensional color plane, and vice versa. The spectral reflectivity calculating method for the side (side of only black) representing a black gradation in a color space or color plane is different from that for remaining sides. As a result, color signals for printed entity are converted into color signals for CRT and are displayed on CRT.

However the foregoing conventional methods (a) and (b) have the following problems:

(a) With method using Neugebauer's formula, (a-1) Although the result of real printing and the color reproduced on a monitor would tend to match with each other if dither or dot-areas are random, it has turned out that they generally do not match with each other as mentioned above.

(a-2) Some modifications of this formula have been proposed, but in any such modification, no match appears between the real printing result and the color reproduced on a monitor likewise in the case of (1-1).

(a-3) As described later with reference to FIG. 2, an optical phenomenon occurs at the peripheral portion of a substrate supporting the color pigment and cannot be reproduced on paper and a uniform-all-over color chip; this optical phenomenon is not considered in Neugebauer's formula. This is the reason why the real printing result and the color monitor reproduced on a monitor do not match with each other.

(b) With the methods disclosed in Japanese Patent Laid-Open Publications Nos. HEI 10-73487, 10-73488 and 10-73489:

(b-1) Any of these conventional methods is only for use with printing entity (printed in ink having a transparency). Whereas in color printing using electrophotography, it is customary to use powder toner, which does not allow light to pass. In such event, assuming that a color pigment is laid over another color pigment, the lower color pigment becomes invisible. Therefore attempt to apply the conventional method in which only transparent ink is considered would be, as a matter of fact, unsuccessful in reproducing color on a monitor.

(b-2) In electrophotography in particular, if the dot-area percentage of black is 100%, namely, if black is printed in uniform-all-over manner, the spectral reflectivity would be roughly constant irrespective of the value of any other color pigment. As a result, in the conventional method in which only transparent ink is thought, it is impossible to estimate a spectral reflectivity when the dot-area percentage of black is 100%.

(b-3) Generally in a color printer, even an image printed in the same color signal in the same page would result in different colors, depending on the local printing region, due to remarkable variation of color. This color deviation is called "in-page error". Because the in-page error cannot be negligible, it would be difficult to realize highly detailed estimation. For increase estimation precision of spectral reflectivity, it has been cherished to measure the to-be-deviated color so that a desired spectral reflectivity is forcibly calculated for the color. Namely, it has been cherished to designate a particular spectral reflectivity for the combination of specified color signals (dot-area percentages); but these conventional methods fail to disclose or teach any technique of realizing the foregoing cherished achievements.

SUMMARY OF THE INVENTION

With the foregoing problems in view, it is a first object of the present invention to provide a method of matching the real output color of a color printer with the color to be reproduced on a monitor by estimating spectral reflectivities precisely with consideration of an optical phenomenon peculiar to the color printer output.

A second object of the present invention is to provide an apparatus for carrying out the above-mentioned method.

A third object of the present invention is to provide a computer-readable recording medium storing a color-printer-output reproducing program.

The above-mentioned first object is accomplished by a method of reproducing on a monitor the output of a color printer which makes color printing using color pigments of n colors (n is a natural number of 2 or larger) including black in combination, with black being printed as a final stage of the color printing, the method comprising the steps of:

calculating at least one coefficient to be used in calculating a particular spectral reflectivity corresponding to an arbitrary dot-area percentage, based on spectral reflectivities measured for a plurality of previously designated color chips (including more than 2 standard color chips of different dot-area percentages on each side) on $n \cdot 2^{n-1}$ sides of an n-dimensional color solid;

calculating the particular spectral reflectivity corresponding to the arbitrary dot-area percentage based on the coefficient calculated in the coefficient calculating step and the plural spectral reflectivities measured for the plural color chips; and converting the particular spectral reflectivity calculated in the spectral reflectivity calculating step into a color signal for the monitor;

wherein in the coefficient calculating step, more than two coefficients representing color characteristics of the output of the color printer and respectively relating to the plural spectral reflectivities of the more than two standards color chips are calculated, based on the plural spectral reflectivities measured for the plural color chips, for one of the $n \cdot 2^{n-1}$ sides which is neither a side where the dot-area percentage of black is 100% nor a side representing a black graduation, and wherein in the spectral reflectivity calculating step, a particular spectral reflectivity corresponding to arbitrary dot-area percentage for the side which is neither the side where the dot-area percentage of black is 100% nor the side representing a black gradation is calculated based on the more than two coefficients calculated in the coefficient calculating step, and a particular spectral reflectivity corresponding to an arbitrary dot-area percentage on the side where the dot-area percentage of black is 100% is calculated based on the plural spectral reflectivities measured for the plural color chips.

The method may further comprise a step of discriminating whether or not color information to be reproduced on the monitor is that for the color printer, based on the plural spectral reflectivities measured for the plural color chips. In the discriminating step, if the result of the discrimination is positive in the discriminating step, the coefficient calculating step, the spectral reflectivity calculating step and the converting step are carried out.

In the discriminating step, a standard deviation of the plural spectral reflectivities measured for the plural color chips on the side where the dot-area percentage of black is 100% may be calculated and then the calculated standard deviation may be compared with a predetermined value, whereupon if the calculated standard deviation is equal to or less than the predetermined value, the color information to be reproduced on the monitor may be judged to be for the color printer.

Alternatively, in the coefficient calculating step, the more than two coefficients may be calculated by the least squares method based on the plural spectral reflectivities measured for the plural color chips. As another alternative, in the coefficient calculating step, two coefficients $\xi$, $\eta$ representing dotgains, which relate respectively to the spectral reflectivities of two reference color chips when the corresponding dot-area percentages are 0% and 100%, may be calculated for every side except the side where the dot-area percentage is 100% and the side representing a black gradation, based on the plural spectral reflectivities measured for the plural color chips. And in the spectral reflectivity calculating step, the two coefficients $\xi$, $\eta$ calculated in the coefficient calculating step may be used in calculating the particular spectral reflectivity corresponding to the arbitrary dot-area percentage.

As still another alternative, in the coefficient calculating step, the plural spectral reflectivities measured for the plural color chips on the side representing a black gradation may be averaged throughout at least part of a visible wavelength range, and two coefficients $\xi$, $\eta$ representing dotgains are calculated based on an average value of the plural spectral reflectivities as the result of the averaging. And in the spectral reflectivity calculating step, the particular spectral reflectivity corresponding to the arbitrary dot-area percentage on the side representing a black gradation may be calculated, based on the two coefficients $\xi$, $\eta$ calculated in the coefficient calculating step.

Further, in the spectral reflectivity calculating step, a constant value to be calculated or determined based on the plural spectral reflectivities measured for the plural color chips may be outputted as the particular spectral reflectivity corresponding to the arbitrary dot-area percentage on the side where the dot-area percentage is 100%.

In the spectral reflectivity calculating step, firstly an (n−1)-dimensional color solid, in which the dot-area percentage of an n-th color pigment to be printed by the color printer is constant, may be calculated from the n-dimensional color solid, secondly an (n−2)-dimensional color solid, in which the dot-area percentage of an n-th color pigment to be printed by the color printer is constant, may be calculated from the (n−1)-dimensional color solid, thirdly a 2-dimensional color plane, in which the dot-area percentage of 3rd to n-th color pigments is constant, may be calculated by repeating a reduction process of the same number of dimensions as described above, and finally, a spectral reflectivity when the color pigments of n colors set to arbitrary dot-area percentages are combined, may be calculated, using the two coefficients $\xi$, $\eta$, from the 2-dimensional color plane.

At that time, in order to designate a specified value for the spectral reflectivity when the color pigments of n colors set to specified dot-area percentages are combined, a weighting coefficient may be calculated based on the inverse number of a distance between a color signal imparting the specified dot-area percentage and a color signal imparting the arbitrary dot-area percentage, then a value obtained by multiplying the specified value with the weighting coefficient may be added to the finally calculated spectral reflectivity. And if the distance is 0 (zero), the specified value may be outputted as the finally calculated spectral reflectivity.

The above-mentioned second object is accomplished by an apparatus for reproducing on a monitor the output of a color printer which makes color printing using color pigments of n colors (n is a natural number of 2 or larger) including black in combination with black being printed as a final stage of the printing, the method comprising:

a coefficient calculating section for calculating at least one coefficient to be used in calculating a particular spectral reflectivity corresponding to an arbitrary dot-area percentage, based on spectral reflectivities measured for a plurality of previously designated color chips (including more than 2 reference color chips of different dot-area percentages on each side) on $n \cdot 2^{n-1}$ sides of an n-dimensional color solid;

a spectral reflectivity calculating section for calculating the particular spectral reflectivity corresponding to the arbitrary dot-area percentage based on the coefficient calculated in the coefficient calculating section and the plural spectral reflectivities measured for the plural color chips; and a converting section for converting the particular spectral reflectivity calculated in the spectral reflectivity calculating section into a color signal for the monitor;

the coefficient calculating section being operable to calculate more than two coefficients representing color characteristics of the output of the color printer and respectively relating to the plural spectral reflectivities of the more than two reference color chips, based on the plural spectral reflectivities measured for the plural color chips, for one of the $n \cdot 2^{n-1}$ sides which is neither a side where the dot-area percentage of black is 100% nor a side representing a black gradation;

the spectral reflectivity calculating section being operable to calculate a particular spectral reflectivity corresponding to arbitrary dot-area percentage for the side which is neither the side where the dot-area percentage of black is 100% nor the side representing a black gradation, based on the more than two coefficients calculated in the coefficient calculating section, and being also operable to calculate a particular spectral reflectivity corresponding to an arbitrary dot-area percentage on the side where the dot-area percentage of black is 100% is calculated based on the plural spectral reflectivities measured for the plural color chips.

The apparatus may further comprise a discriminating section for discriminating whether or not color information to be reproduced on the monitor is that for the color printer, based on the plural spectral reflectivities measured for the plural color chips. If the result of the discrimination is positive in the discriminating section, the operations of the coefficient calculating section, the spectral reflectivity calculating section and the converting section are carried out.

The above-mentioned third object is accomplished by a computer-readable recording medium storing a color-printer-output reproducing program which instructs a computer to execute a function of reproducing on a monitor the output of a color printer which makes color printing using color pigments of n colors (n is a natural number of 2 or larger) including black in combination with black being printed as a final stage of the printing, the color-printer-output reproducing program instructing the computer to function as the following:

- a coefficient calculating section for calculating at least one coefficient to be used in calculating a particular spectral reflectivity corresponding to an arbitrary dot-area percentage, based on spectral reflectivities measured for a plurality of previously designated color chips (including more than 2 reference color chips of different dot-area percentages on each side) on $n \cdot 2^{n-1}$ sides of an n-dimensional color solid;
- a spectral reflectivity calculating section for calculating the particular spectral reflectivity corresponding to the arbitrary dot-area percentage based on the coefficient calculated in the coefficient calculating section and the plural spectral reflectivities measured for the plural color chips; and
- converting section for converting the particular spectral reflectivity calculated in the spectral reflectivity calculating section into a color signal for the monitor;
- the coefficient calculating section being operable to calculate more than two coefficients representing color characteristics of the output of the color printer and respectively relating to the plural spectral reflectivities of the more than two reference color chips, based on the plural spectral reflectivities measured for the plural color chips, for one of the $n \cdot 2^{n-1}$ sides which is neither a side where the dot-area percentage of black is 100% nor a side representing a black gradation;
- the spectral reflectivity calculating section being operable to calculate a particular spectral reflectivity corresponding to arbitrary dot-area percentage for the side which is neither the side where the dot-area percentage of black is 100% nor the side representing a black gradation, based on the more than two coefficients calculated in the coefficient calculating section, and being also operable to calculate a particular spectral reflectivity corresponding to an arbitrary dot-area percentage on the side where the dot-area percentage of black is 100% is calculated based on the plural spectral reflectivities measured for the plural color chips.

At that time, the color-printer-output reproducing program further instructs the computer to function as a discriminating section for discriminating whether or not color information to be reproduced on the monitor is that for the color printer, based on the plural spectral reflectivities measured for the plural color chips, and wherein if the result of the discrimination is positive in the discriminating section, the color-printer-output reproducing program instructs the computer to function as the coefficient calculating section, the spectral reflectivity calculating section and the converting section.

According to the color-printer-output reproducing method and apparatus, and the computer-readable recording medium of the present invention, since the spectral reflectivity can be estimated precisely with consideration of an optical phenomenon peculiar to the color printer output, it is possible to match the real color of the color printer output and the color to be reproduced on the monitor.

DESCRIPTION OF THE PREFERRED EMBODIMENT(S)

One preferred embodiment of the present invention will now be described in detail with reference to the accompanying drawings.

Figure 1:
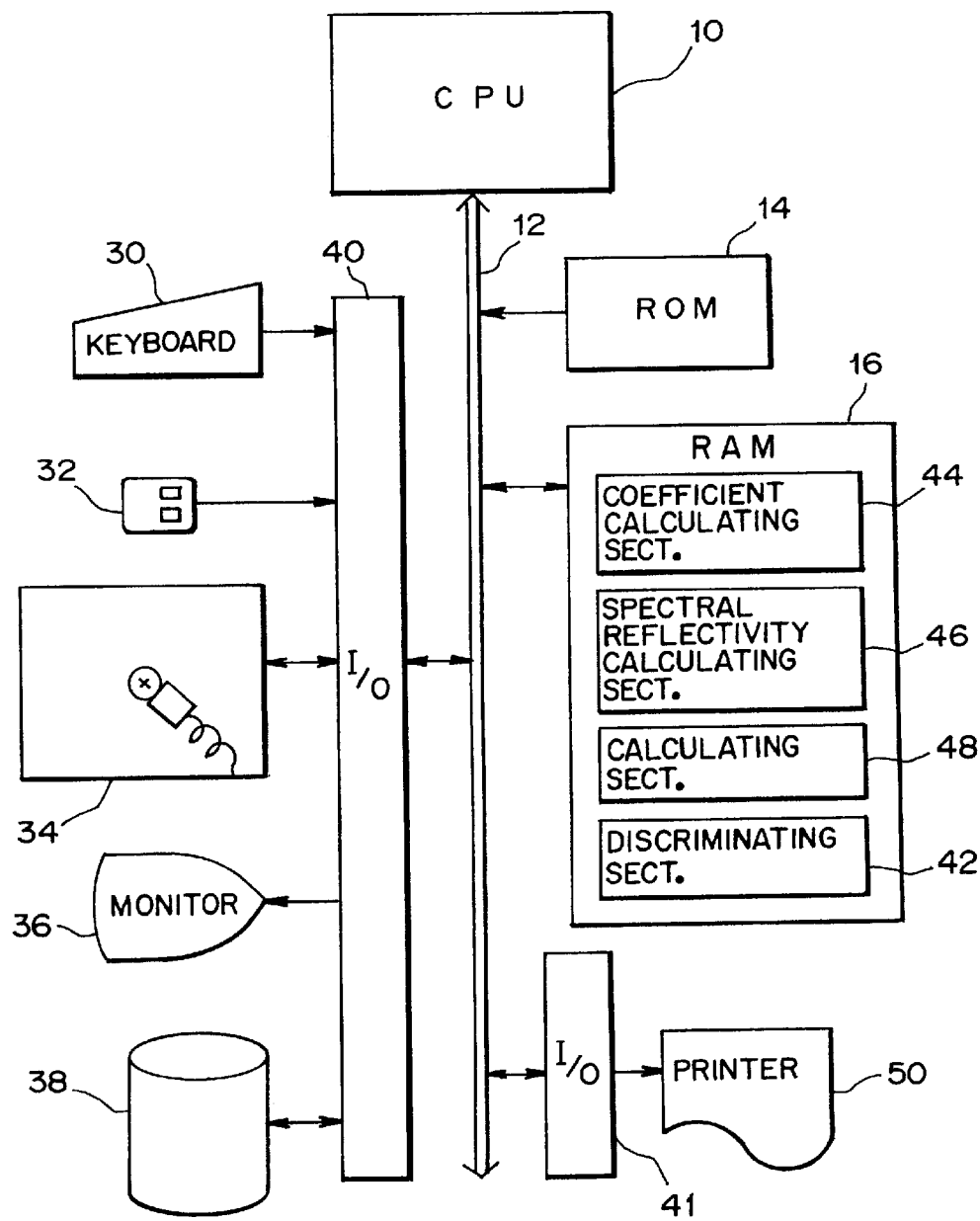
FIG. 1 is a block diagram showing a computer system (color reproducing apparatus) for carrying out a color-printer-output reproducing method according to one embodiment of the present invention.

FIG. 1 is a block diagram showing a computer system (color reproducing apparatus) for carrying out a color-printer-output reproducing method according to the preferred embodiment of the present invention. As shown in FIG. 1, the computer system of the present embodiment includes a CPU 10, and a bus line 12 connected to the CPU 10.

To the bus line 12, a ROM 14 and a RAM 16 are connected, and also a keyboard 30, a mouse 32, a digitizer 34, a monitor (such as CRT, LCD, PDP) 36 and a magnetic disc 38 are connected via an input/output interface (I/O) 40, and still also a printer 50 is connected via another input/output interface (I/O) 41.

And in RAM 16, an application program for realizing a discriminating section 42, a coefficient calculating section 44, a spectral reflectivity calculating section 46 and a converting section 48 is stored. As the CPU 10 executes the application program from RAM 16 via the bus line 12, it realizes functions (detailed description will follow) of the discriminating section 42, the coefficient calculating section 44, the spectral reflectivity calculating section 46 and the converting section 48 so that the color-printer-output reproducing method of the present invention is carried out.

The program for realizing the functions of the discriminating section 42, the coefficient calculating section 44, the spectral reflectivity calculating section 46 and the converting section 48 is provided as recorded in a computer-readable recording medium, such as a flexible disc or a CD-ROM. For use, a computer reads out the program from the recording medium and transfers and stores the read-out program to and in an internal storage device or an external storage device. Alternatively the program may be stored in a storage device (recording medium), such as a magnetic disc, an optical disc or a magneto-optical disc, and the program may be provided from the storage device to the computer via a communications channel or route.

When realizing the functions of the discriminating section 42, the coefficient calculating section 44, the spectral reflectivity calculating section 46 and the converting section 48, the program stored in the internal storage device (RAM 16 in the present embodiment) is executed by a microprocessor (CPU 10 in the present embodiment) of the computer. At that time, the computer may directly read out the program recorded in the recording medium and may execute the read-out program.

In the present embodiment, the term "computer" includes hardware and an operation system, meaning the hardware operable under the control of the operation system. Assuming that no operation system is required and the application program solely operates the hardware, the hardware itself is regarded as a computer. The hardware includes at least a microprocessor, such as CPU, and means for reading out a computer program recorded in a recording medium.

The application program includes program codes for instructing the above-mentioned computer to realize the functions of the discriminating section 42, the coefficient calculating section 44, the spectral reflectivity calculating section 46 and the converting section 48. Alternatively part of these functions may be realized by the operation system rather than the application program.

Further, the recording medium of the present embodiment may be various kinds of computer-readable media exemplified by a flexible disc, CD-ROM, a magnetic disc, an optical disc, a magneto-optical disc, an IC card, a ROM cartridge, a magnetic tape, a punch card, an internal storage device (memory such as RAM or ROM) or an internal storage device of a computer, and printed matter with codes such as bar codes printed on it.

The computer system of the present embodiment shown in FIG. 1 reproduces on the monitor 36 the output of a color printer which makes color printing using color pigments of n colors (n is a natural number of 2 or larger; 4 colors Y, M, C, K in the present embodiment) including black (K) in combination, with black being printed as a final stage of the printing. The computer system has functions of the discriminating section 42, the coefficient calculating section 44, the spectral reflectivity calculating section 46 and the converting section 48.

The discriminating section 42 discriminates whether or not color information to be reproduced on the monitor 36 is that for the color printer, based on the spectral reflectivities of previously designated color chips. If the result of discrimination is positive, the operations of the coefficient calculating section 44, the spectral reflectivity calculating section 46 and the converting section 48 are executed.

The discriminating section 42, as described later in detail, calculates a standard deviation of the spectral reflectivities of the color chips on a certain side where the dot-area percentage of black is 100%, and compares the standard deviation and a predetermined value (e.g., 0.1). If the standard deviation is equal to or below the predetermined value, the discriminating section 42 judges that the color information to be reproduced on the monitor 36 is for the color printer.

The coefficient calculating section 44 calculates coefficients $\alpha_i, \beta_i, \gamma_i, \xi_i, \eta_i$ (i is a dot-area percentage), which are to be used in calculating a particular spectral reflectivity corresponding to an arbitrary dot-area percentage, based on spectral reflectivities measured for a plurality of previously designated color chips (including 3 reference color chips with the dot-area percentages of black being 0%, 50%, 100%, respectively, on each side) on $n \cdot 2^{n-1}$ sides (in the present embodiment, since n=4, 32 sides) of an n-dimensional color solid.

Now assume that the number of previously designated color chips on each side is N. In the present embodiment, the color chips on each side are designated one for each of 0%, 10%, 20%, 30%, 40%, 50%, 60%, 70%, 80%, 90%, 100% of dot-area percentage i; so N=11. Accordingly the total number of previously designated color chips is 11×32=352.

Here the coefficient calculating section 44 calculates 3 kinds of coefficients $\alpha_i, \beta_i, \gamma_i$ representing color characteristics of the color printer output with respect to the spectral reflectivities $S_{0\%}$ (=$S_{paper}$), $S_{50\%}$, $S_{100\%}$, of 3 reference color chips, by the least squires method, based on the plural spectral reflectivities measured for the plural color chips, for every one of 32 sides composing a 4-mensional color solid, except a side where the dot-area percentage of black is 100% and a side representing a black gradation.

Also, the coefficient calculating section 44 calculates 2 kinds of coefficients $\xi_i, \eta_i$ representing dotgains with respect to the spectral reflectivities $S_{0\%}, S_{100\%}$, of 2 reference color chips with the dot-area percentages being 0%, 100%, respectively, by the least squires method, based on the plural spectral reflectivities measured for the plural color chips, for every side except a side where the dot-area percentage of black is 100% and a side representing a black gradation.

Further, the coefficient averages the spectral reflectivities measured for the color chips on the side representing a black gradation, throughout at least part of a visible wavelength range to obtain an average value, and calculates 2 kinds of coefficients $\xi_i, \eta_i$ representing dotgains, based on the average value.

In the meantime, the spectral reflectivity calculating section 46, as described later with reference to FIGS. 3 through 6, calculates at least one spectral reflectivity corresponding to an arbitrary dot-area percentage, based on the coefficients $\alpha_i$, $\beta_i$, $\gamma_i$, $\xi_i$, $\eta_i$, which are calculated by the coefficient calculating section 44, or based on the spectral reflectivities of previously designated color chips.

Here the spectral reflectivity calculating section 46 calculates at least one spectral reflectivity corresponding to an arbitrary dot-area percentage on any side other than the side where the dot-area percentage of black is 100% and the side representing a black gradation, based on the coefficients $\alpha_i$, $\beta_i$, $\gamma_i$ calculated by the coefficient calculating section 44, and also calculates at least one spectral reflectivity corresponding to an arbitrary dot-area percentage on the side where the dot-area percentage of black is 100%, based on the spectral reflectivities of previously designated color chips.

Also, the spectral reflectivity calculating section 46 calculates the particular spectral reflectivity coresponding to an arbitrary dot-area percentage using the coefficients $\xi_i$, $\eta_i$ calculated by the coeffecient calculating section 44, and calculates at least one spectral reflectivity corresponding to an arbitrary dot-area percentage on the side representing a black gradation, using or based on the coefficients $\xi_i$, calculated by the coefficient calculating section 44.

Further, the spectral reflectivity calculating section 46 outputs a constant value (e.g., 0.035) calculated and determined based on the spectral reflectivities of previously designated color chips, as the spectral reflectivity for an arbitrary dot-area percentage on the side where the dot-area percentage of black is 100%.

Still further, the spectral reflectivity calculating section 46, as described later with reference to FIGS. 7 and 8, calculates from an n-dimensional color solid a 3-dimensional color solid in which the dot-area percentage of the 4th color pigment (black) to be printed at a final stage of the color printing is constant, and then calculates from this 3-dimensional color solid a 2-dimensional color plane in which the dot-area percentage of the 3rd color pigment (cyan in the present embodiment) to be printed at a third stage of the color printing, whereupon using coefficients $\xi_i$, $\eta_i$, the spectral reflectivity calculating section 46 calculates from this 2-dimensional color plane at least one spectral reflectivity for a combination of 4 color pigments set to an arbitrary dot-area percentage.

Moreover, in order to designate a specified value for the spectral reflectivity when 4 color pigments set to specified dot-area percentages are combined, the spectral reflectivity calculating section 46, as described later, calculates a weighting coefficient based on an inverse number of the distance between a color signal imparting the specified dot-area percentage and a color signal imparting the arbitrary dot-area percentage, and adds a value obtained by multiplying the weighting coefficient by a specified value to the calculated spectral reflectivity. If the distance is 0 (zero), the spectral reflectivity calculating section 46 outputs a specified value as the spectral reflectivity.

The converting section 48 converts the spectral reflectivity calculated by the spectral reflectivity calculating section 46 into a color signal (e.g., an RGB signal) for the monitor 36, making a color display on the monitor 36 based on the color signal.

The color-printer-output reproducing method of the present embodiment will now be described in detail with reference to FIGS. 2 through 13.

In the present embodiment, the spectral reflectivities obtained from $n \cdot 2^{n-1}$ sides selected from a combination of arbitrary number n color pigments are used. To express these sides, following definitions ① through ③ are provided:

① On each side, a value of the color signal (i.e., a dot-area percentage) is limited to one of (a) 0%, (b) 100%, and (c) a combination of plural (11 in the present embodiment) values between 0%–100%, taking only 1 color amount the combination in the case of (c). Namely, these individual sides represent peripheral sides of the color printer's color region to be reproduced on the monitor 36.

② In the present embodiment, it is assumed that n=4 and 4 arbitrary color pigments containing black are cyan, magenta, yellow and black. Each side is represented using color reference characters C, M, Y, K; for example, cyan 100%, magenta 100%, yellow 100% and black 100% are respectively represented by "C", "M", "Y" and "K", and if the individual color is 0%, no representation with character is provided. The order of representation with color reference characters is the same as the order of printing; the color reference character of a color signal taking a combination of plural values between 0% and 100% is represented as the last. In the present embodiment, the order of printing of the four colors is "YMCK". These colors may be printed in an alternative order, as long as black is printed for the last.

③ According to the definitions ①, ②, the side for the combination of values appearing in Table 1 is represented by "YKC". Namely, the dot-area percentage of each of yellow and black is 100%; the dot-area percentage of magenta is 0%; and the dot-area percentage of cyan takes values in units of 10% between 0% and 100%.

TABLE 1

| YELLOW (Y) | MAGENTA (M) | CYAN (C) | BLACK (K) |
|---|---|---|---|
| 100% | 0% | 0% | 100% |
| 100% | 0% | 10% | 100% |
| 100% | 0% | 20% | 100% |
| 100% | 0% | 30% | 100% |
| 100% | 0% | 40% | 100% |
| 100% | 0% | 50% | 100% |
| 100% | 0% | 60% | 100% |
| 100% | 0% | 70% | 100% |
| 100% | 0% | 80% | 100% |
| 100% | 0% | 90% | 100% |
| 100% | 0% | 100% | 100% |

As mentioned above, it is assumed that the number of pieces of color data on each side is represented by N; in the present embodiment, N=11.

The color reproducing method of the present embodiment will now be described in detail in accordance with the foregoing representation:

(1) First, the discriminating section 42 of the present embodiment performs a discrimination process (1-1) through (1-5) described below by only one time as preparation of a color-printer-output reproducing process.

(1-1) The spectral reflectivities for wavelengths in a visible wavelength range, on the respective sides where the dot-area percentage of black is 100% (i.e., 12 sides KC, KM, KY, CKM, MKC, CKY, MKY, YKC, YKM, MCKY, YCKM, YMKC), are averaged to obtain an average value for every previously designated color chip. For example, if the visible wavelength range is 380 nm–730 nm, the total sum of the individual spectral reflectivities one for each 10 nm (i.e., 36 spectral reflectivities for wavelengths 380 nm, 390 nm, 400 nm, . . . , 730 nm) is divided by 36. This average value of the spectral reflectivities is thus obtained for each of 11 color chips on each side. The visible wavelength range should by no means be limited to 380 nm–730 nm.

(1-2) A standard deviation of the average value of the spectral reflectivities calculated for 11 color chips on each side is calculated.

(1-3) The standard deviation calculated in (1-2) is compared with a predetermined value (e.g., 0.1).

(1-4) If the standard deviation is larger than the predetermined value as the result of comparison in (1-3), a later-described color reproducing method of the present embodiment is not applied to the color information to be reproduced on the monitor 36.

(1-5) If the deviation is smaller than the predetermined value as the result of comparison in (1-3), then the color information to be reproduced on the monitor 36 is judged to be the one for color printer, so the later-described color reproducing method of the present embodiment is applied to this color information. Namely, as mentioned above, the operations of the coefficient calculating section 44, the spectral reflectivity calculating section 46 and the converting section 48 are performed.

Figure 12:
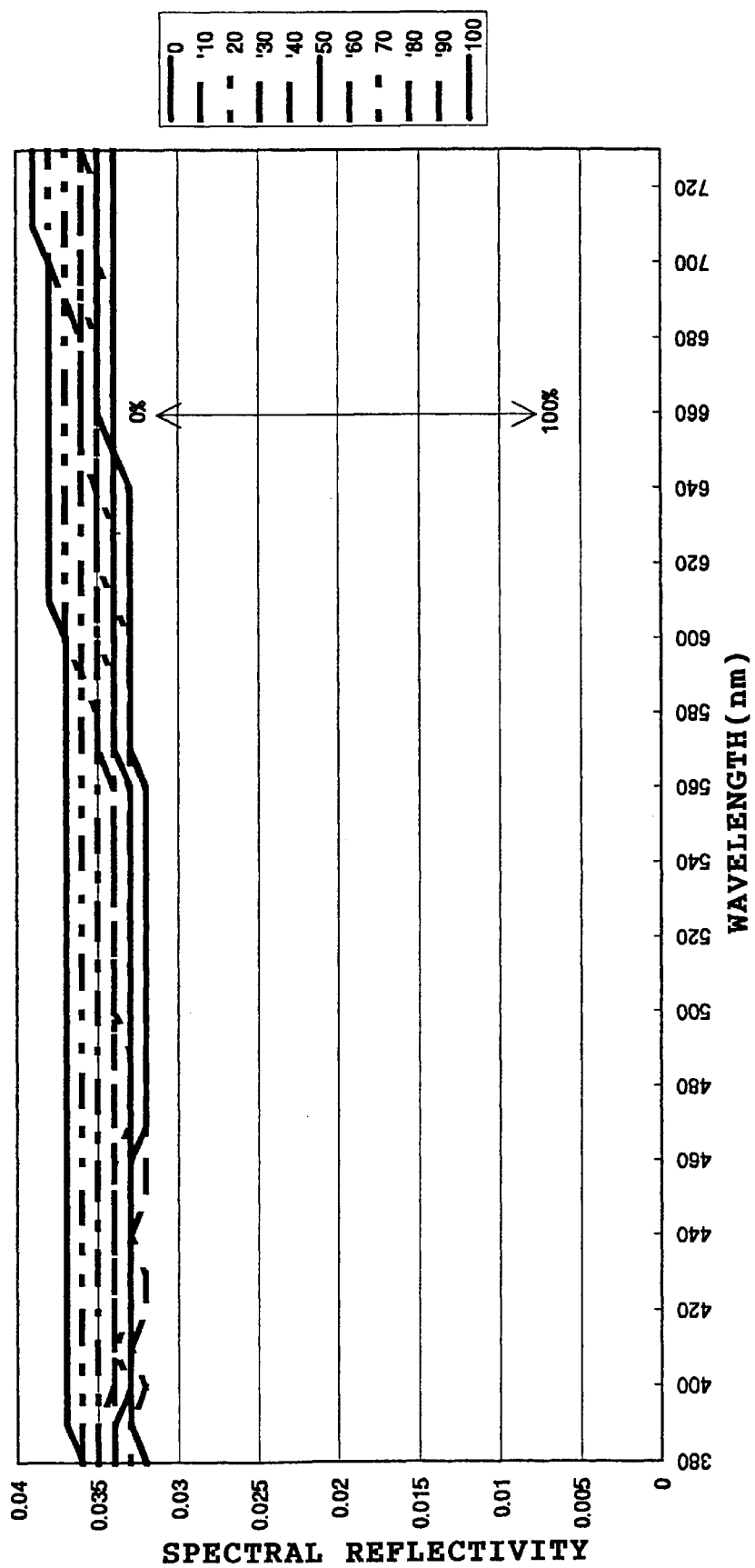
FIG. 12 is a graph showing the result of measurement of the spectral reflectivities (of 4-dimensional colors) when the dot-area percentages of black, cyan and magenta are 100% and the dot-area percentage of yellow is 0%–100%.
Figure 13:
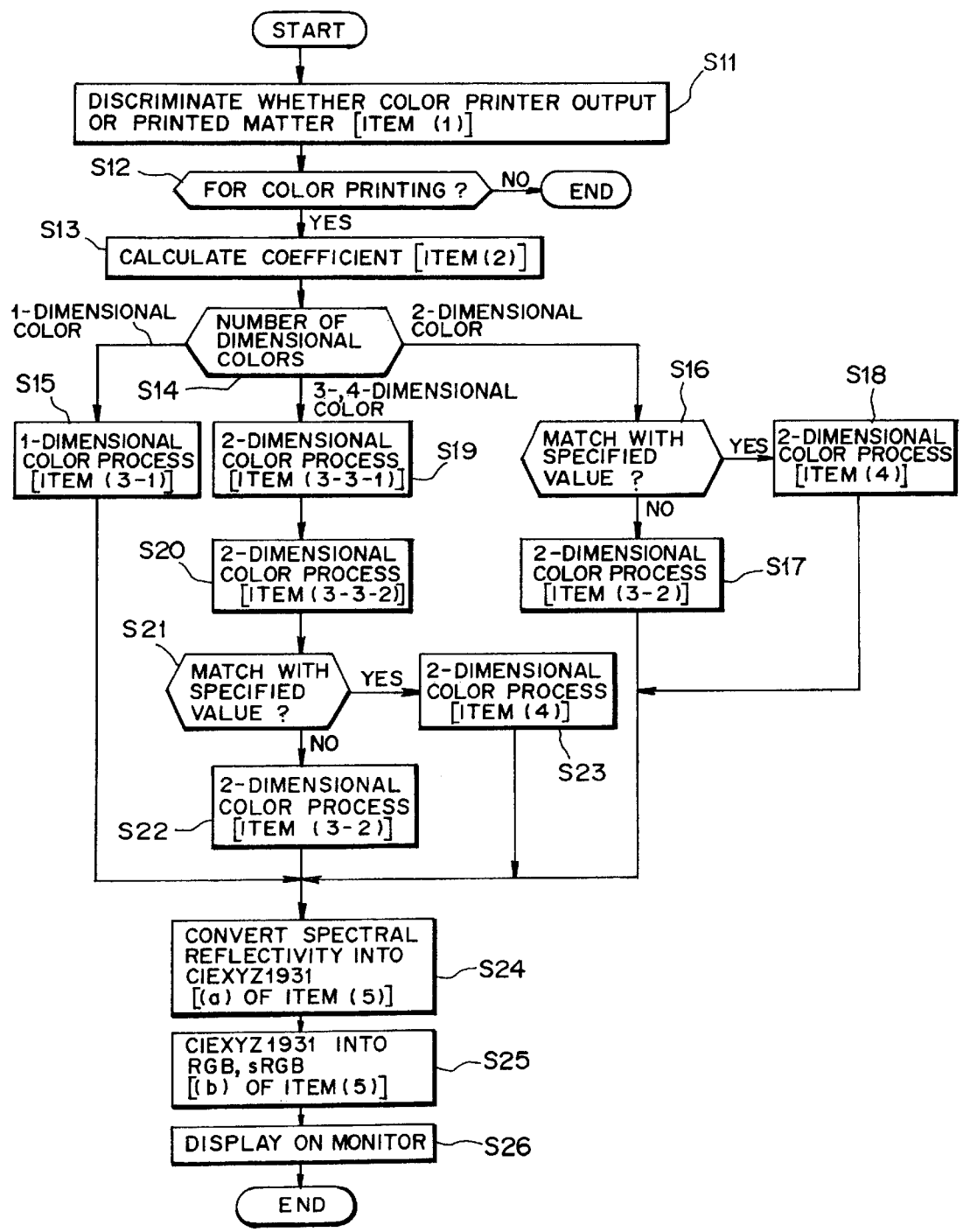
FIG. 13 is a flowchart illustrating the flow of procedure to reproduce the color printer output according to the present embodiment.

Here in a color printer in which black is printed at a final stage of the color printing, if the dot-area percentage of black is 100%, such as shown in FIG. 12, the spectral reflectivity is substantially constant, irrespective of the wavelength, whichever values the dot-area percentages of the remaining colors, i.e. cyan, magenta and yellow, assume.

The toner to be used in a color printer, as mentioned above, is solid, originally having no transparency allowing light not to pass. Therefore, according to the result of printing by the color printer, the color of the toner printed for the last, namely, the color of toner to come out at the top appears visible so that whichever color existing under the top color toner is not influential on how the top color is seen. Because the color printer has such a characteristic, the values of the spectral reflectivities of all color chips are substantially the same, irrespective of the other colors, if the dot-area percentage of black is 100%; this is, the above-mentioned standard deviation becomes smaller. Utilizing this characteristics, the discriminating section 42 of the present embodiment discriminates whether or not the color information to be reproduced on the monitor 36 is the one for color printer.

FIG. 12 is a graph showing the result of measurement of the spectral reflectivities (of 4-dimensional colors) when the dot-area percentage of black, cyan and magenta is 100% and that of yellow is 0%–100%. As it turns out from FIG. 12, if the dot-area percentage of black is 100%, it is possible to substitute a constant value for the spectral reflectivities with a very high degree of precision. In the example of FIG. 12, this constant value may be "0.035".

(2) After the color printer output has been discriminated as mentioned above, the coefficient calculating section 44 of the present embodiment performs a coefficient calculation process (2-1), (2-2) described later by only one time.

(2-1) The sides except the sides (the above-mentioned 12 sides) where the dot-area percentage of black is 100% and the side representing a black gradation (the side indicated by "K") are the following 19 sides:

C, M, Y, CM, MY, CY, MC, YM, YC, CK, MK, YK, MCY, YCM, YMC, MCK, YCK, YMK, YMCK.

On each of these sides, the spectral reflectivities of N (11 in the present embodiment) color chips exist for each color signal. For N spectral reflectivities on the above-mentioned 19 sides, the coefficient calculating section 44 of the present embodiment calculates the coefficients $\alpha$, $\beta$, $\gamma$, $\xi$, $\eta$ corresponding to N color chips of each side by the least squares method using the following formulae (1) and (2).

Before describing the formulae (1) and (2), physical meanings of the coefficients $\alpha$, $\beta$, $\gamma$ and the coefficients $\xi$, $\eta$ will now be explained.

Figure 2:
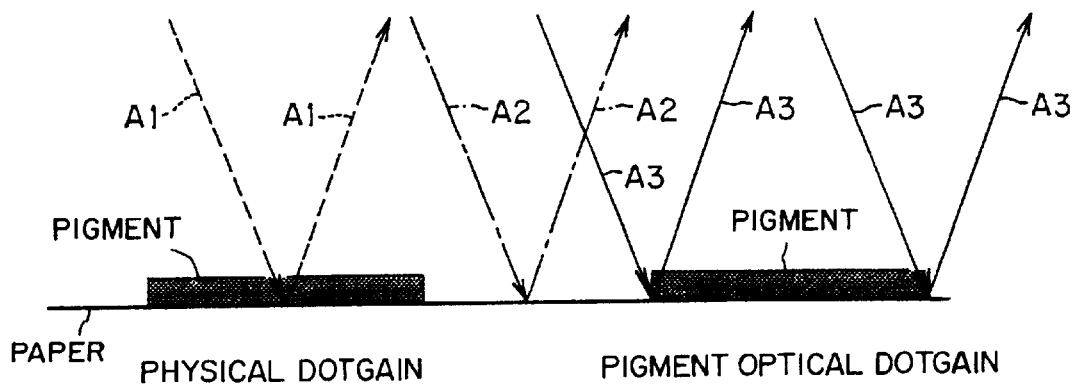
FIG. 2 is a diagram illustrating the physical meaning of a coefficient based on which spectral refpectivities are to be calculated in the present embodiment.

(2-1-1) Physical meaning of coefficients $\alpha$, $\beta$, $\gamma$:

As shown in FIG. 2, if the color pigment to be printed by a color printer is on the paper, every light coming into naked eyes is classified into 3 kinds of light respectively indicated by arrows A1, A2, A3.

Arrow A1 indicates light (physical dotgain) passing through the color pigment during both incidence and reflection, while the coefficient $\gamma$ represents an amount of such light. The effect of the light is most remarkable when the dot-area percentage of the color pigment is 100%.

In the meantime, arrow A2 indicates light not passing through the color pigment during either incidence or reflection, the the coefficient $\alpha$ represents an amount of such light. The effect of the light is most remarkable when the dot-area percentage of the color pigment is 0%.

And arrow A3 indicates light (optical dotgain) passing through the color pigment during only one of incidence and reflection, and the coefficient $\beta$ represents an amount of such light. The effect of the light is most remarkable when the dot-area percentage of the color pigment is 50%.

This is the very reason why the result of actual color printing and the color reproduced on the monitor do not match when Neugebauer's formula is used and do match when the method of the present invention is used. Specifically, in the case using Neugebauer formula, although light indicated by arrows A1, A2 is considered, the effect of light (optical phenomenon which occurs at the peripheral portion of a substrate supporting the color pigment and cannot be reproduced on paper and a uniform-all-over color chip) indicated by arrow A3 is ignored. Whereas in the method of the present invention, in view of the effect of light indicated by arrow A3 and in order to reproduce the spectral reflectivity for a later-described virtual 1-dimensional color with fidelity, the coefficients $\alpha$, $\beta$, $\gamma$ are used.

(2-1-2) Physical meaning of coefficients $\xi$, $\eta$:

The coefficients $\xi$, $\eta$ correspond to the above-mentioned coefficients $\alpha$, $\gamma$; the coefficient $\eta$ represents an amount of light passing through the color pigment during both incidence and reflection, and the coefficient represents an amount of light not passing through the color pigment during either incidence or reflection.

Here the area devoid of the color pigment is represented by the coefficient $\xi$, and the area where the pigment exists is represented by the coefficient $\eta$. It is thereby possible to grasp the area supporting the color pigment more accurately than the conventional method (e.g., Murray-Davies formula). This can be applied for all of the 19 sides as compared with only 1-dimensional color for which the conventional method can be applied. Namely, in the present embodiment, estimating precision is improved for combinations of all basic colors from 1- to 4-dimensional colors by calculating the area supporting the color pigment more accurately than the conventional method.

$$S_i(\lambda)=\alpha_i \cdot S_{paper}(\lambda)+\beta_i \cdot S_{50\%}(\lambda)+\gamma_i \cdot S_{100\%}(\lambda) \quad (1)$$

$$S_i(\lambda)=\xi_i \cdot S_{paper}(\lambda)+\eta_i \cdot S_{100\%}(\lambda) \quad (2)$$

In the above formulae (1), (2), $\lambda$: wavelength (nm) (input information).

$S_i(\lambda)$: i represents a value (dot-area percentage) of each of N (11 in the present embodiment) color chips for the dot-area percentages 0%–100% (0%, 10%, 20%, 30%, 40%, 50%, 60%, 70%, 80%, 90%, 100% in the present embodiment) on each side, and $S_i(\lambda)$ is the spectral distribution of the color (output information).

$S_{paper}(\lambda)$ $(=S_{0\%}(\lambda)$: the spectral reflectivity of dot-free white area (input information).

$S_{50\%}(\lambda)$: the spectral reflectivity of a color chip supporting the color pigment corresponding to the dot-area percentage 50% (input information).

$S_{100\%}(\lambda)$: the spectral reflectivity of a color chip supporting the color pigment corresponding to the dot-area percentage 100% (input information).

$\alpha_i, \beta_i, \gamma_i$: the coefficients $\alpha, \beta, \gamma$ corresponding to a color chip of the dot-area percentage 100% (input information).

$\xi_i, \eta_i$: the coefficients $\xi, \eta$ corresponding to a color chip of the dot-area percentage i % (output information). Data labeled with (input information) is data to be inputted in the above formulae (1), (2) in the least squares method, and data labeled with (output information) is data to be calculated and outputted by the least squares method.

Figure 11:
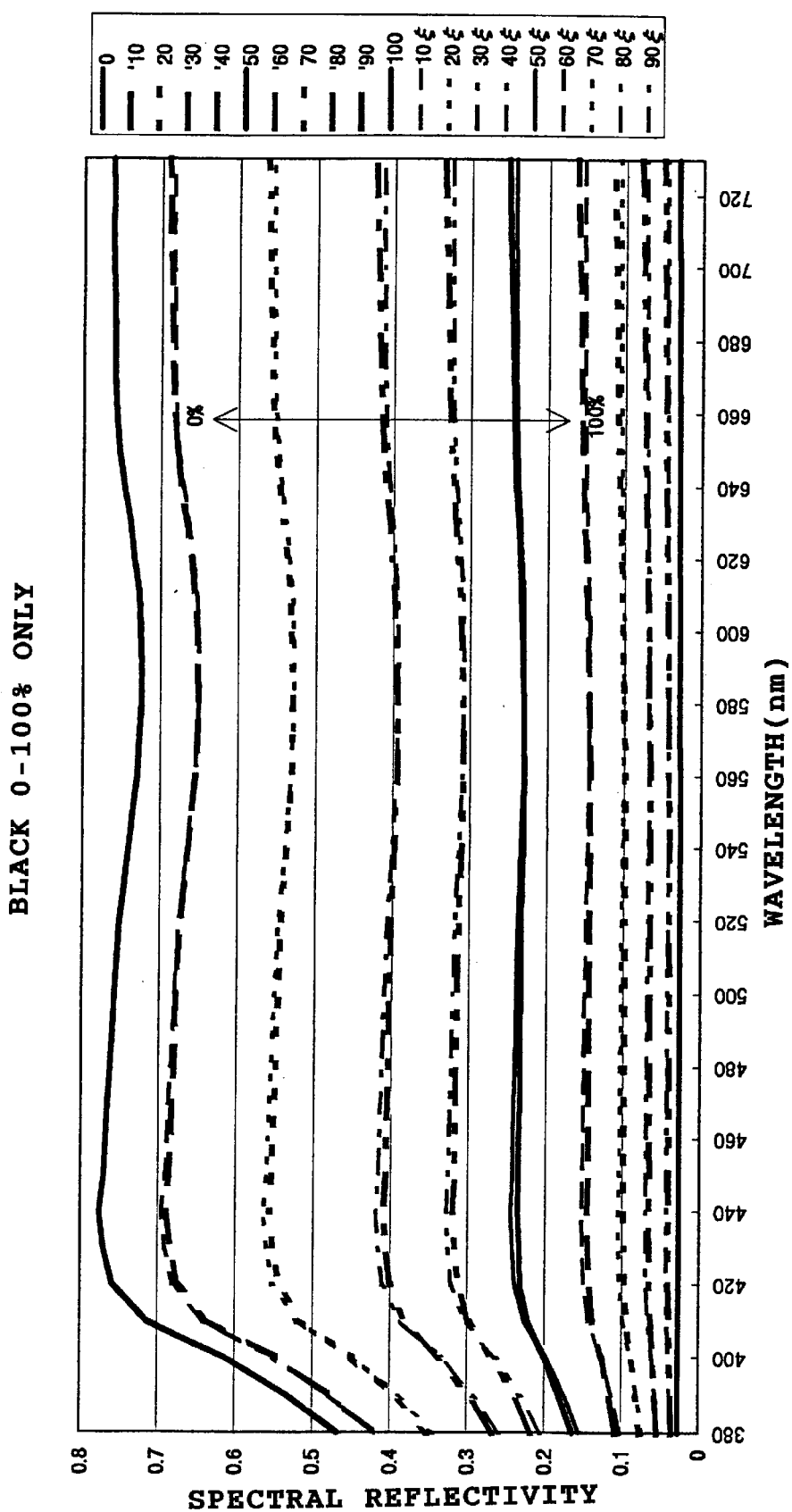
FIG. 11 is a graph showing the result of calculation and estimation of the spectral reflectivities of 1-dimensional color, black, using coefficients $\xi, \eta$.

(2-2) For N (11 in the present embodiment) color chips belonging to the side (K) representing a black gradation, the least squares method cannot be applied due to the linearity of data as readily turns out from FIG. 11.

In the present embodiment, the coefficients $\xi, \eta$ representing a dotgain are calculated as follows, and the calculated coefficients $\xi, \eta$ are used to reproduce the spectral reflectivity and to grasp the area supporting black. If the discriminating section 42 has judged that the method of the present invention is applicable, the light indicated by arrow A3 in FIG. 2 may be neglected because the transmittance of black is very small.

For calculating the coefficients $\xi, \eta$, first the spectral reflectivities of N color chips on the side (K) representing a black gradation are plotted on a graph as shown in FIG. 11, and then a flat portion of the graph is determined, whereupon an average value of the spectral reflectivity of the flat portion is calculated. The range (flat portion) to be averaged may be throughout at least part of the entire visible wavelength range.

Assuming that among N color chips, an average value for a color chip whose dot-area percentage of black is i % is $S_i$ ($0 \leq i \leq 100$), the coefficients $\xi_i, \eta_i$, corresponding to the color chip is calculated by solving the following simultaneous equations (3):

$$\xi_i \cdot S_{paper} + \eta_i \cdot S_{100\%} = S_i$$

$$\xi_i + \eta_i = 1 \quad (3)$$

where $S_{paper}$ is an average value in the wavelength range of spectral reflectivities for color-dot-free white paper (input information), and $S_{100\%}$ is an average value in the wavelength range of spectral reflectivities for a color chip supporting the color pigment corresponding to the dot-area percentage 100% (input information).

(3) The coefficient calculating process is carried out in the above-mentioned manner to calculate the coefficients $\alpha_i, \beta_i, \gamma_i, \xi_i, \eta_i$, whereupon the spectral reflectivity calculating section 46 of the present embodiment performs the following processes (3-1) through (3-3) to calculate and estimate spectral reflectivities.

For each of 32 sides, the method of calculating and estimating spectral reflectivities corresponding to color signals (dot-area percentage) for color chips other than the previously designated color chips will be described in item (3-1). In the following description, each of 32 sides will be called "virtual 1-dimensional color".

Then the method of calculating and estimating "virtual 2-dimensional color" from the virtual 1-dimensional color will be described in item (3-2). The term "virtual 2-dimensional color" means a color in which the dot-area percentages for two of cyan, magenta, yellow and black color signals are arbitrary, and the dot-area percentages for the remaining two color signals are fixed at 0% or 100%.

Subsequently, spectral reflectivities corresponding to arbitrary color signals of cyan, magenta, yellow and black, as described in item (3-3), can be calculated and estimated as the dimensions are sequentially reduced from a 4-dimensional color solid represented by cyan, magenta, yellow and black color signals, by using the method described in items (3-1) and (3-2) and carrying out the method of item (3-2) for the last.

(3-1) Virtual 1-dimensional color calculating and estimating method:

For calculating and estimating a virtual 1-dimensional color, the following data calculated in the above-mentioned process (2) is used for each side.

① The sides except the side where the value (dot-area percentage) of black is 100% and the side representing a black gradation:

(a) values of $\alpha_i, \beta_i, \gamma_i$ for N color chips.

(b) values of $\xi_i, \eta_i$ for N color chip.

(c) spectral reflectivities $S_{paper}(\lambda)$, $S_{50\%}(\lambda)$, $S_{100\%}(\lambda)$ for color chips where color signal values (dot-area percentage) are 0%, 50%, 100%.

(d) values of i for N color chips (i represents plural values between 0% and 100%).

② The side representing a black gradation:

(a) values of $\xi_i, \eta_i$ for N color chip.

(b) spectral reflectivities $S_{paper}(\lambda)$, $S_{100\%}(\lambda)$ for color chips where color signal values are 0%, 100%.

(c) values of i for N color chips (i represents plural values between 0% and 100%).

③ The side where the value (dot-area percentage) of black is 100%:

(a) spectral reflectivities $S_i(\lambda)$ for N color chips.

(b) values of i for N color chips (i represents plural values between 0% and 100%).

Using the foregoing data, the method of calculating and estimating the spectral reflectivities of a virtual 1-dimensional color will be described as follows.

(3-1-1) In the following description, color signals of yellow, magenta, cyan, black (i.e., the dot-area percentages of Y, M, C, K) are previously given in units of %. Here because a virtual 1-dimensional color is dealt with, it is possible to designate only one color among 4 colors arbitrarily in a range between 0% and 100%, as previously defined, with the remaining 3 colors fixed to one of 0% and 100%. This arbitrary designatable value (dot-area percentage) is hereinafter represented by j (%).

(3-1-2) To estimate spectral reflectivities $S_j(\lambda)$ corresponding to color signals with this arbitrary dot-area percentage j%, the above formulae (1) and (2) are used inversely to the previous case. Namely, $$S_j(\lambda) = \alpha_j \cdot S_{paper}(\lambda) + \beta_j \cdot S_{50\%}(\lambda) + \gamma_j \cdot S_{100\%}(\lambda) \quad (4)$$

$$S_j(\lambda) = \xi_j \cdot S_{paper}(\lambda) + \eta_j \cdot S_{100\%}(\lambda) \quad (5)$$

The above formula (4) is applied for sides except a side where a value of black is 100% and a side representing a black gradation. And the above formula (5) is applied for the side representing a black gradation.

Figure 3:
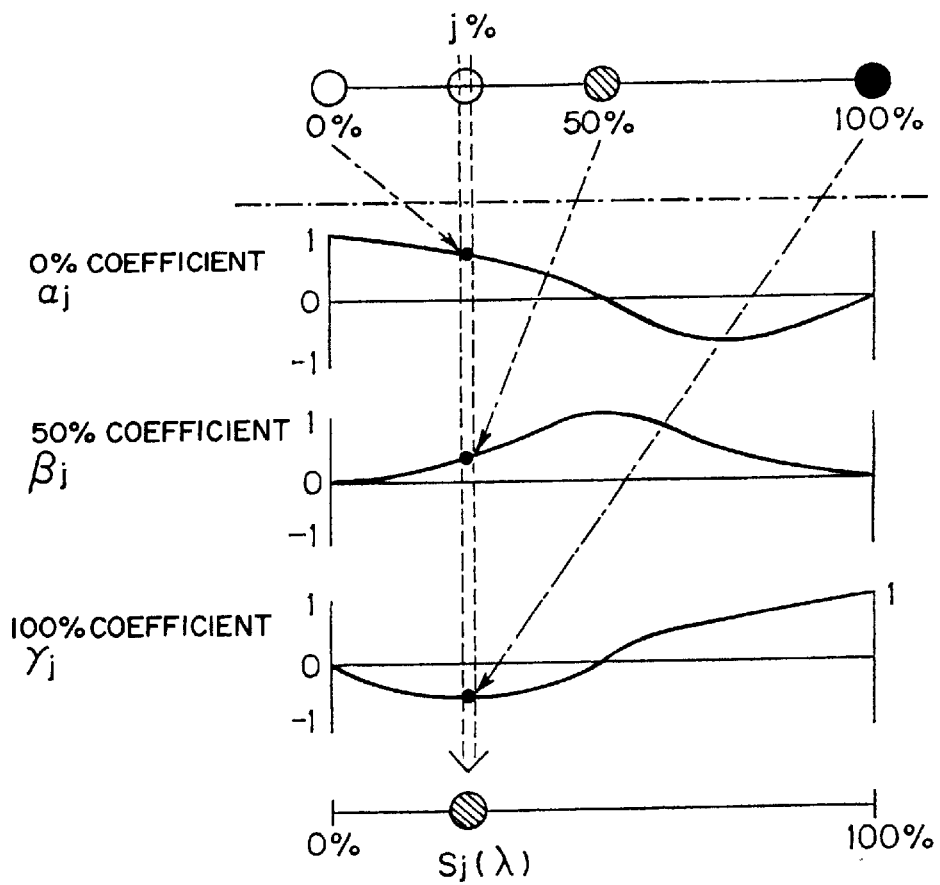
FIG. 3 is a diagram illustrating a spectral reflectivity calculating technique using coefficients $\alpha, \beta, \gamma$ in the present embodiment.

The individual coefficient $\alpha_j, \beta_j, \gamma_j$ depends on the dot-area percentage j as shown in FIG. 3. The value of the coefficient $\alpha_j$ corresponding to the spectral reflectivity $S_{paper}(\lambda)$ is 1 when the dot-area percentage j is 0%, and 0 when it is 50% and 100%. Likewise the value of the coefficient $\beta_j$ corresponding to the spectral reflectivity $S_{50\%}(\lambda)$ is 1 when the dot-area percentage j is 50%, and 0 when it is 0% and 100%. And the value of the coefficient $\gamma_j$ corresponding to the spectral reflectivity $S_{100\%}(\lambda)$ is 1 when the dot-area percentage j is 100%, and 0 when it is 0% and 50%.

Further, the coefficient $\alpha_j$ is represented by N coefficients $\alpha_i$ (i=0%, 10%, 20%, 30%, 40%, 50%, 60%, 70%, 80%, 90%, 100%, 11 in total in the present embodiment) obtained in the same process (2). Likewise the coefficient $\beta_j$ is represented by N coefficients $\beta_j$ obtained in the above process (2). And the coefficient $\gamma_j$ is represented by N coefficients $\gamma_j$ obtained in the same process (2).

The values of these coefficients $\alpha_j$, $\beta_j$, $\gamma_j$ of arbitrary dot-area percentage j are determined according to, for example, the following formulae (6-1) through (6-3) by interpolating the above-mentioned N coefficients $\alpha_i$, $\beta_i$, $\gamma_i$, respectively.

Figure 4:
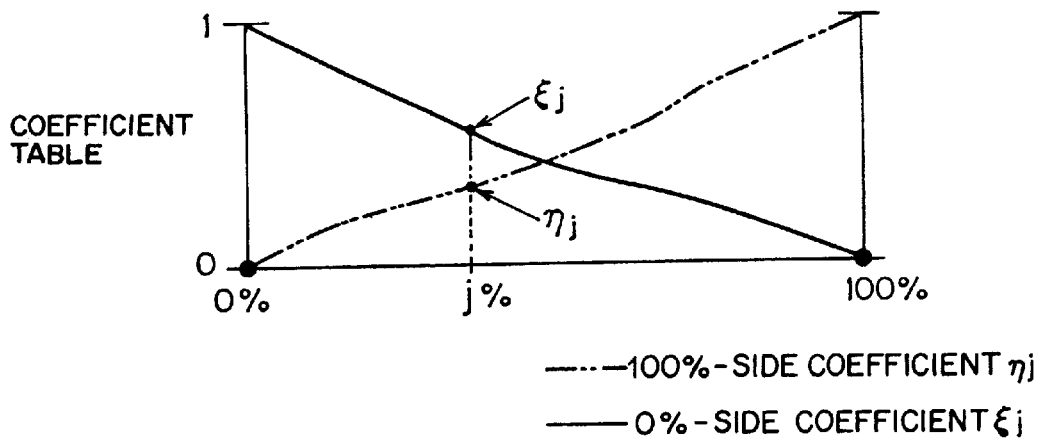
FIG. 4 is a diagram illustrating another spectral reflectivity calculating technique using coefficients $\xi, \eta$ in the present embodiment.

The individual coefficient $\alpha_j$, $\beta_j$, $\gamma_j$, like the coefficients, $\alpha_i$, $\beta_i$, $\gamma_i$, depends on the dot-area percentage j as shown in FIG. 4. The value of the coefficient $\xi_j$ corresponding to the spectral reflectivity $S_{paper}(\lambda)$ is 1 when the dot-area percentage j is 0%, and 0 when it is 100%. Likewise the value of the coefficient $\eta_j$ corresponding to the spectral reflectivity $S_{100\%}(\lambda)$ is 1 when the dot-area percentage j is 100%, and 0 when it is 0%.

Further, the coefficient $\xi_j$ is represented by N coefficients $\xi_i$ (i=0%, 10%, 20%, 30%, 40%, 50%, 60%, 70%, 80%, 90%, 100%, 11 in total in the present embodiment) obtained in the same process (2). Likewise the coefficient $\eta_j$ is represented by N coefficients $\eta_j$ obtained in the above process (2).

The values of these coefficients $\xi_j$, $\eta_j$ of arbitrary dot-area percentage j are determined according to, for example, the following formulae (7-1) and (7-2) by interpolating the above-mentioned N coefficients $\xi_i$, $\eta_i$, respectively.

Namely, among the above-mentioned values of i, two values k and l adjacent to and around j corresponding to N color chips are-calculated, whereupon the coefficients $a_j$, $b_j$, $g_j$ and the coefficients $\xi_j$, $\eta_j$ are calculated by substituting the obtained values for k and l in the following formulae (6-1) through (6-3) and (7-1), (7-2). Here $k \leq j \leq l$. Then the spectral reflectivities $S_j(\lambda)$ corresponding to an arbitrary dot-area percentage j are calculated by substituting the coefficients $\alpha_j$, $\beta_j$, $\gamma_j$ and the coefficients $\xi_j$, $\eta_j$ respectively calculated by the formulae (6-1) through (6-3) and (7-1), (7-2) in the above formulae (3) and (4), respectively.

$$\alpha_j = \frac{l-j}{l-k}\alpha_k + \frac{j-k}{l-k}\alpha_l, \quad (6\text{-}1)$$

$$\beta_j = \frac{l-j}{l-k}\beta_k + \frac{j-k}{l-k}\beta_l, \quad (6\text{-}2)$$

$$\gamma_j = \frac{l-j}{l-k}\gamma_k + \frac{j-k}{l-k}\gamma_l \quad (6\text{-}3)$$

$$\xi_j = \frac{l-j}{l-k}\xi_k + \frac{j-k}{l-k}\xi_l, \quad (7\text{-}1)$$

$$\eta_j = \frac{l-j}{l-k}\eta_k + \frac{j-k}{l-k}\eta_l \quad (7\text{-}2)$$

Figure 9:
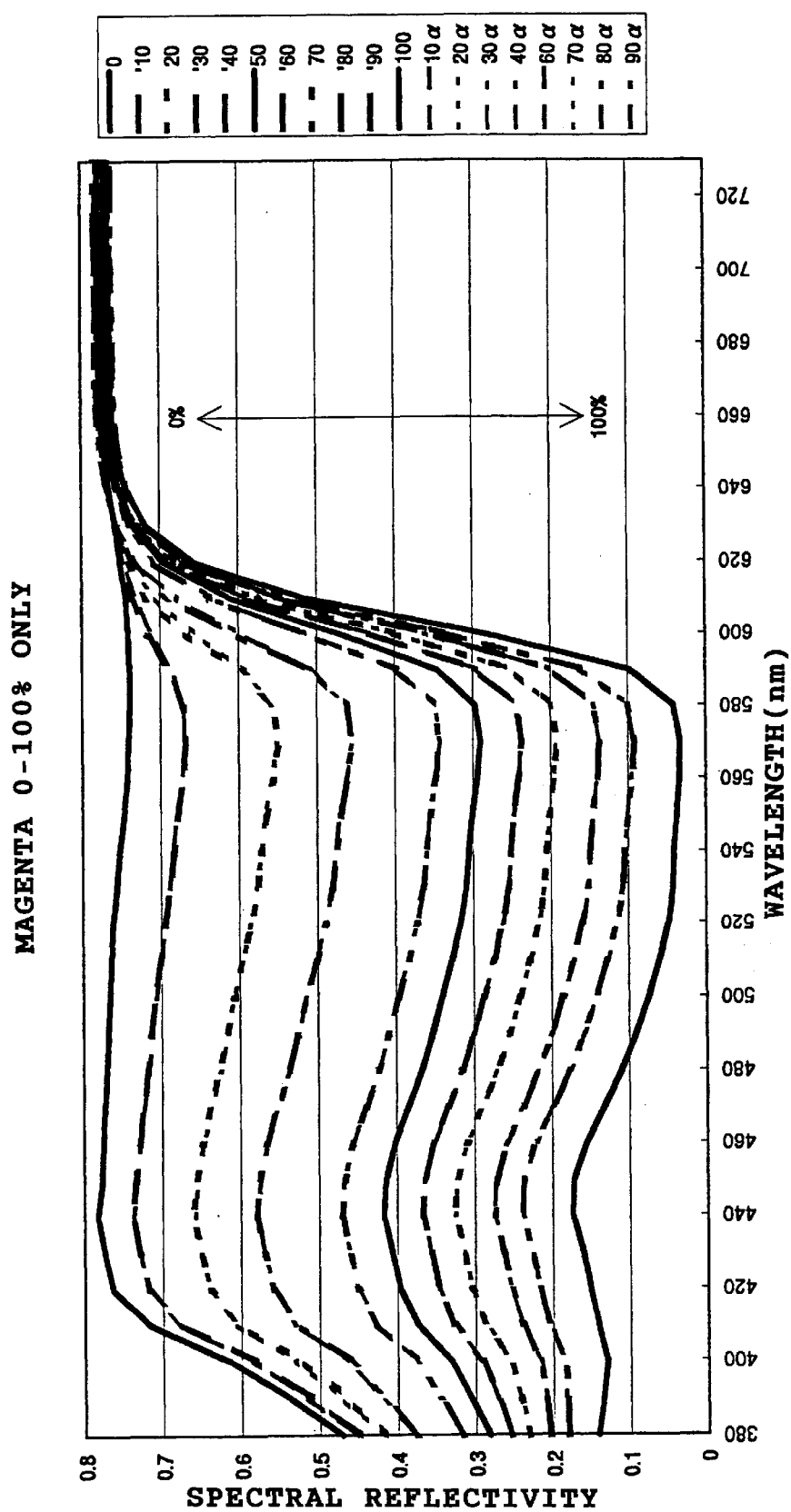
FIG. 9 is a graph showing the result of calculation and estimation of the spectral reflectivities of 1-dimensional color, magenta, using coefficients $\alpha, \beta, \gamma$.
Figure 10:
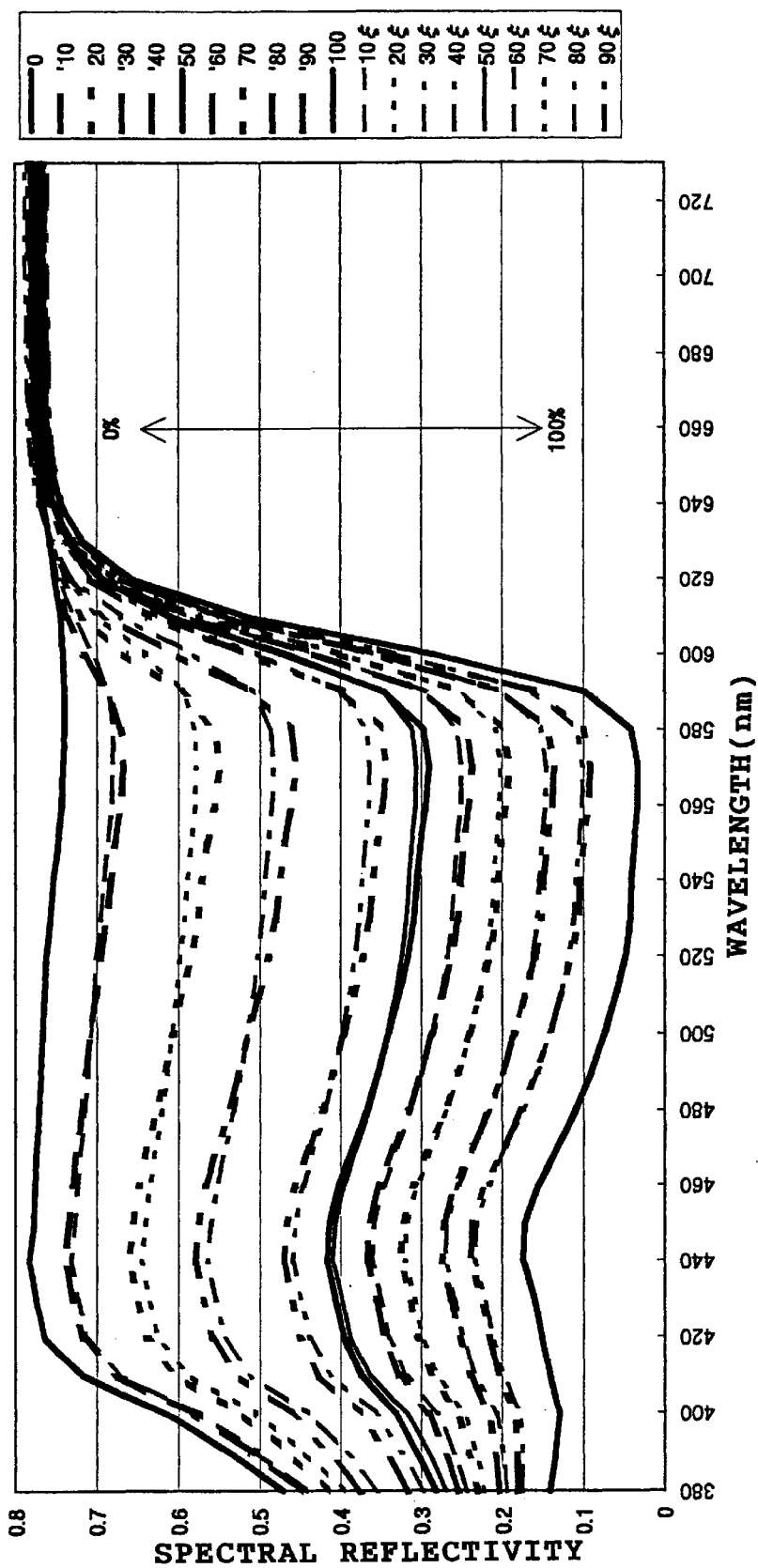
FIG. 10 is a graph showing the result of calculation and estimation of the spectral reflectivities of 1-dimensional color, magenta, using coefficients $\xi, \eta$.

The spectral reflectivities calculated and estimated using the above formulae (4), (5), (6-1) through (6-3), (7-1), (7-2) are shown, along with the actually measured spectral reflectivities, in FIGS. 9 through 11, in which thick lines indicate the actually measured spectral reflectivities and thin lines indicate the spectral reflectivities calculated and estimated by the method of the present embodiment.

FIG. 9 is a graph showing the result of calculation and estimation of the spectral reflectivities of 1-dimensional color, magenta, using coefficients $\alpha$, $\beta$, $\gamma$ (formulae (4) and (6-1)–(6-3)) FIG. 10 is a graph showing the result of calculation and estimation of the spectral reflectivities of 1-dimensional color, magenta, using coefficients $\xi$, $\eta$ (formulae (5) and (7-1), (7-2)). FIG. 11 is a graph showing the result of calculation and estimation of the spectral reflectivities of 1-dimensional color, black, using coefficients $\xi$, $\eta$ (formulae (5) and (7-1), (7-2)).

As shown in FIG. 9, using the coefficients $\alpha$, $\beta$, $\gamma$ (formulae (4) and (6-1)–(6-3)), it is possible to calculate and estimate the spectral reflectivities of a virtual 1-dimensional color (1-dimentional color of magenta) with a very high degree of accuracy.

As shown in FIG. 10, using the coefficients $\xi$, $\eta$ (formulae (5) and (7-1), (7-2)), it is possible to calculate and estimate the spectral reflectivities of a virtual 1-dimensional color (1-dimentional color of magenta) with a somewhat high degree of accuracy.

Further, as shown in FIG. 11, using the coefficient $\xi$, $\eta$ (formulae (5) and (7-1), (7-2)), it is possible to calculate and estimate the spectral reflectivities corresponding to an arbitrary dot-area percentage on the side representing a block gradation (1-dimentional color of black) with a very high degree of accuracy.

For calculating and estimating the spectral reflectivities of a virtual 1-dimensional color using the method of the present embodiment, the coefficients $\alpha$, $\beta$, $\gamma$ (formulae (4) and (6-1)–(6-3)) rather than the coefficients $\xi$, $\eta$ (formulae (5) and (7-1), (7-2)) are used. However, the coefficients $\xi_j$, $\eta_j$ calculated by the formulae (7-1), (7-2) are used as values (dotgains) representing positions on each side for calculating and estimating the spectral reflectivities of a virtual 2-dimensional color.

(3-1-3) In calculating and estimating the spectral reflectivity $S_j(\lambda)$ for an arbitrary position on a side where the value (dot-area percentage) of black is 100%, the following formula (8) is used. Namely, the spectral reflectivity $S_j(\lambda)$ is calculated by substituting the above-mentioned two values k, l and the known spectral reflectivities $S_k(\lambda)$ and $S_l(\lambda)$ into the following formula (8) and directly by proportionally distributing the spectral reflectivities $S_k(\lambda)$ and $S_l(\lambda)$.

$$S_j(\lambda) = \frac{l-j}{l-k}S_k(\lambda) + \frac{j-k}{l-k}S_l(\lambda) \quad (8)$$

(3-2) Method of calculating and estimating a virtual 2-dimensional color:

For calculating and estimating a virtual 2-dimensional color, the spectral reflectivity calculating section 46 of the present embodiment performs the following processes (3-2-1) through (3-2-7) using the above-mentioned virtual 1-dimentional color calculating and estimating method in item (3-1).

(3-2-1) Here a method of calculating a virtual 2-dimensional color relating to a color pigment A and a color pigment B will be described. At that time, a virtual 2-dimensional color with the dot-area percentages of the color pigments A and B being x% and y%, respectively, is a color to be estimated. And the position of the color on a 2-dimensional color plane is represented by a point (x, y), and the spectral reflectivity at the position is represented by $S_{x,y}(\lambda)$ The point (x, y) is called the color position and does not indicate an actual position.

Figure 5:
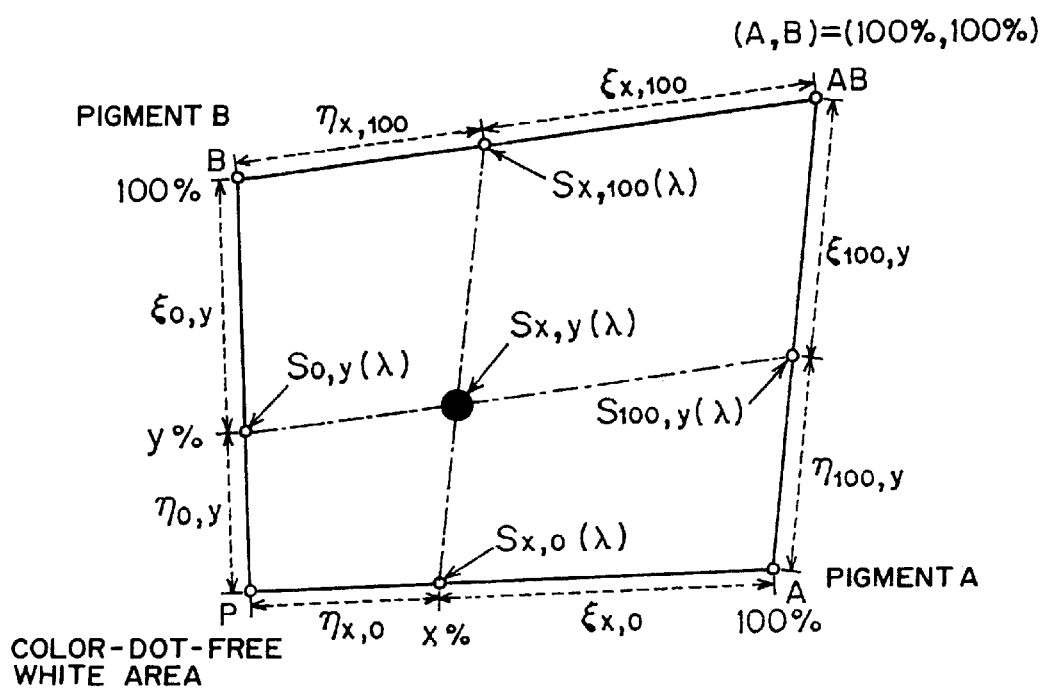
FIG. 5 is a diagram illustrating positional relations of data needed to calculate and estimate virtual 2-dimensional colors in the present embodiment.

(3-2-2) 4 sides composing a plane including the point (x, y) are determined. Here to determine the individual sides and the plane as shown in FIG. 5, the following data (a) through (d) are used. These data (a) through (d) are all calculatable by the above-mentioned method in item (3-1). FIG. 5 is a diagram illustrating positional relations of data needed to calculate and estimate a virtual 2-dimensional color in the present embodiment.

(a) spectral reflectivity $S_{x,0}(\lambda)$ and coefficients $\xi_{x,0}$, $\eta_{x,0}$ corresponding to the point (x, 0) on "pigment A side" represented by (i, 0) where $0 \leq i \leq 100$.

(b) spectral reflectivity $S_{x,100}(\lambda)$ and coefficients $\xi_{x,100}$, $\eta_{x,100}$ corresponding to the point (x, 100) on "pigments A, B 100% side" represented by (i, 100) where $0 \leq i \leq 100$ (this "pigments A, B 100% side" confronts "pigment A side" as shown in FIG. 5).

(c) spectral reflectivity $S_{0,y}(\lambda)$ and coefficients $\xi_{0,y}$, $\eta_{0,y}$ corresponding to the point (0, y) on "side of pigment B" represented by (0, j) where $0 \leq j \leq 100$.

(d) spectral reflectivity $S_{100,y}(\lambda)$ and coefficients $\xi_{100,y}$, $\eta_{100,y}$ corresponding to the point (100, y) on "pigment A 100%, B side" represented by (100, j) where $0 \leq j \leq 100$ (this "pigment A 100%, B side" confronts "pigment B side" as shown in FIG. 5).

But if a side where the value (dot-area percentage) of black is 100% is included in the above-mentioned 4 sides, the coefficients $\xi$, $\eta$ of a confronting side where the value (dot-area percentage) of black is 0% are used as they are.

Figure 6:
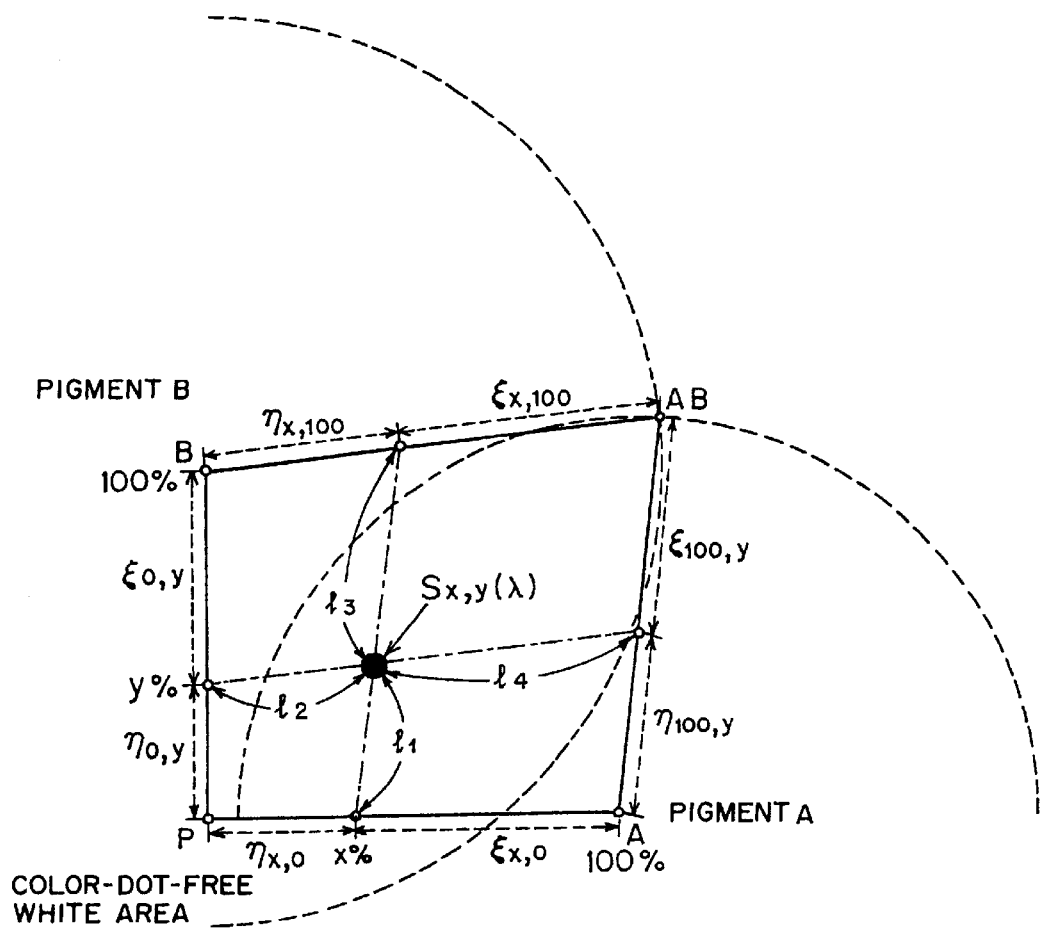
FIG. 6 is a diagram illustrating a method of calculating and estimating the spectral reflectivities of the virtual 2-dimensional colors in the present embodiment.

(3-2-3) These 4 sides are arranged as shown in FIG. 6. How to arrange the 4 sides will now be described. FIG. 6 is a diagram illustrating a method of calculating and estimating a spectral reflectivity of a virtual 2-dimensional color in the present embodiment.

(a) (0, 0) is assumed as origin (P).

(b) "pigment A side" and "pigment B side" are arranged horizontally and vertically, respectively, from the origin. At that time, the length of "pigment A side", the position of point (x, 0), the length of "pigment B side", and the position of point (0, y) are set as follows:

The length of "pigment A side": $\xi_{x,0}+\eta_{x,0}$.

The position of point (x, 0): position dividing "pigment A side" at a ratio of $\eta_{x,0}:\xi_{x,0}$.

The length of "pigment B side": $\xi_{0,y}+\eta_{0,y}$.

The position of point (0, y): position dividing "pigment A side" at a ratio of $\eta_{0,y}:\xi_{0,y}$.

(c) "pigment A, B 100% side" and "pigment A 100%, B side" are arranged as follows. Here the lengths of these sides and the method of calculating the point on the individual side are identical with (b) above, so their description is omitted.

As shown in FIG. 6, a circle whose radius has a length $(\xi_{100,y}+\eta_{100,y})$ from a point (100, 0), and another circle whose radius has a length $(\xi_{x,100}+\eta_{x,100})$ from a point (0, 100) are described. At that time, these two circles cross each other at two points. Then, among the two circles, one is selected which exists in the same dimension as that constituted by "pigment A side" and "pigment B side" and which is shorter in distance (length) from the position of a coordinate value (100, 100) on the plane shown in FIG. 6. And "pigment A, B 100% side" and "pigment A 100%, B side" are arranged so as to cross each other at the selected intercrossing points.

(3-2-4) The position of point (x, y) corresponding to a spectral reflectivity $S_{x,y}(\lambda)$ to be obtained is determined as follows. A first point (x, 0) and a second point (x, 100) are connected by a straight line, and a third point (0, y) and a fourth point (100, y) are connected by another straight line; the crossing point of these two straight lines is assumed as the position of point (x, y).

(3-2-5) The lengths between the individual points are defined as follows. Here the term "length means a Euclid length in the 2-dimensional color plane shown in FIG. 6.

Length between points (x, y) and (x, 0): 11

Length between points (x, y) and (0, y): 12

Length between points (x, y) and (x, 100): 13

Length between points (x, y) and (100, y): 14

(3-2-6) The weighting coefficient $w_i$ (i=1, 2, 3, 4) is defined to satisfy the following formulae (9-1) through (9-4) or formulae (10-1) through (10-4). The former (9-1)–(9-4) and the latter (10-1)–(10-4) should not be mixedly used. Namely, if (9-1) of the former is used for $w_1$, (9-2), (9-3), (9-4) of the former should be used also for $w_2$, $w_3$, $w_4$, respectively. Otherwise if (10-1) of the latter is used for $w_1$, (10-2), (10-3), (10-4) of the latter should be used also for $w_2$, $w_3$, $w_4$, respectively.

$$W_1 = \frac{l_3}{\sum_{i=1}^{4} l_i}, \quad (9\text{-}1)$$

$$W_2 = \frac{l_4}{\sum_{i=1}^{4} l_i}, \quad (9\text{-}2)$$

$$W_3 = \frac{l_1}{\sum_{i=1}^{4} l_i}, \quad (9\text{-}3)$$

$$W_4 = \frac{l_2}{\sum_{i=1}^{4} l_i}, \quad (9\text{-}4)$$

$$W_1 = \frac{l_1^{-1}}{\sum_{i=1}^{4} l_i^{-1}}, \quad (10\text{-}1)$$

$$W_2 = \frac{l_2^{-1}}{\sum_{i=1}^{4} l_i^{-1}}, \quad (10\text{-}2)$$

$$W_3 = \frac{l_3^{-1}}{\sum_{i=1}^{4} l_i^{-1}}, \quad (10\text{-}3)$$

$$W_4 = \frac{l_4^{-1}}{\sum_{i=1}^{4} l_i^{-1}}, \quad (10\text{-}4)$$

(3-2-7) The spectral reflectivity $S_{x,y}(\lambda)$ is calculated by substituting the above calculated spectral reflectivities $S_{x,0}(\lambda)$, $S_{0,y}(\lambda)$, $S_{x,100}(\lambda)$, $S_{100,y}(\lambda)$ and weighting coefficients $w_1$, $w_2$, $w_3$, $w_4$ into the following formula (11):

$$S_{x,y}(\lambda)=w_1 \cdot S_{x,0}(\lambda)+w_2 \cdot S_{0,y}(\lambda)+w_3 \cdot S_{x,100}(\lambda)+w_4 \cdot S_{100,y}(\lambda) \quad (11)$$

(3-3) Method of calculating and estimating spectral reflectivities for up to 4-dimentional colors:

For calculating and estimating a virtual 4-dimentional color, using the above-mentioned virtual 1-dimensional color calculating and estimating method in item (3-1) above and the above-mentioned virtual 2-dimensional color calculating and estimating method in item (3-2) above, the spectral reflectivity calculating section 46 carries out the following processes (3-3-1) through (3-3-6), which will now be described with reference to FIGS. 6 and 7.

Figure 7:
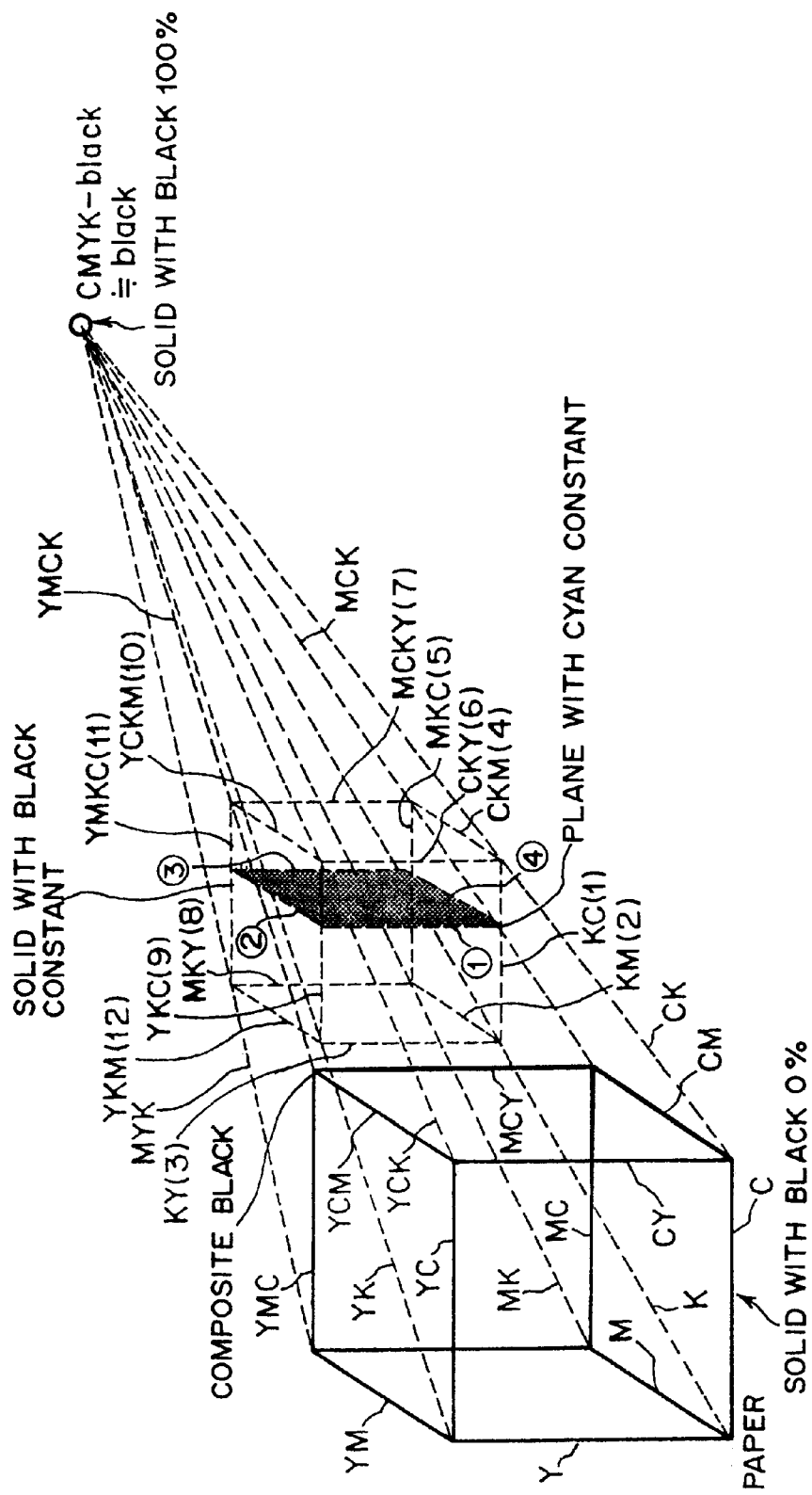
FIG. 7 is a diagram illustrating a number-of-dimensions reduction process in the present embodiment.
Figure 8:
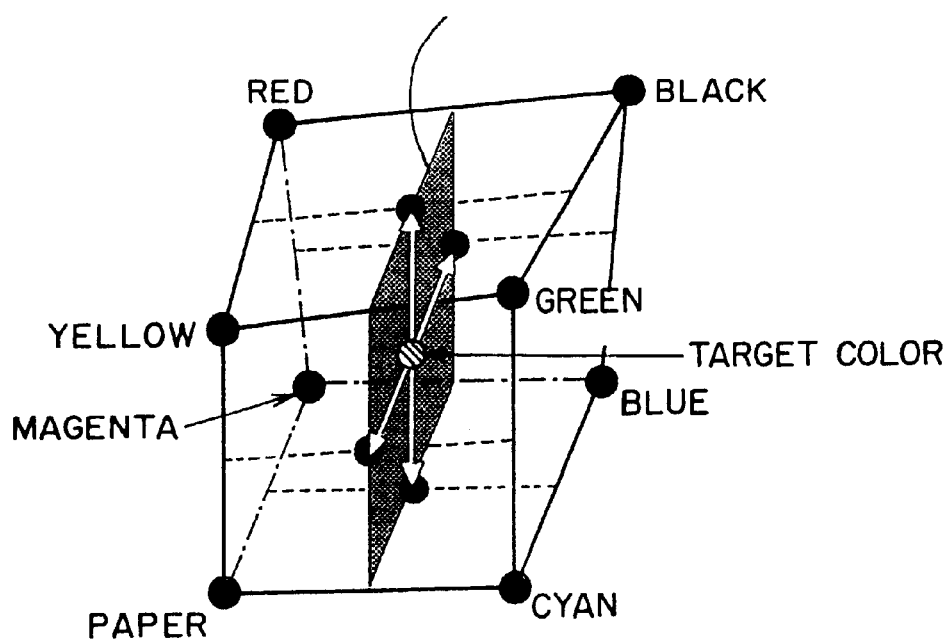
FIG. 8 is a diagram illustrating a method of calculating and estimating the spectral reflectivities of 3-dimensional colors YMC in the present embodiment.

FIG. 7 is a diagram illustrating a number-of-dimensions reduction process in the present embodiment, and FIG. 8 is a diagram illustrating a method of calculating and estimating the spectral reflectivities of 3-dimensional colors YMC in the present embodiment.

Here the dot-area percentages of the individual colors (Y, M, C, K) are previously given in units of % by color signals of yellow, magenta, cyan and black, where $0 \leq Y$, M, C, $K \leq 100$.

In printing using pigments having transparency allowing light to path, a 3-dimensional color solid is obtained even when the dot-area percentage of black is 100%. However, with the dot-area percentage of black 100%, since black is superposed over the previous colors for the last in a color printer, the printed result will be the same color at all, irrespective of however yellow, magenta, cyan have been printed. Therefore, in a color printer, a 3-dimensional color solid with black 100% will shrink substantially at a single point as shown in FIG. 7. Utilizing this uniqueness of color printers, it is possible to perform a number-of-dimensions reduction of a 4-dimensional color solid of Y, M, C, K in the following simple technique. In FIG. 7, the term "composite black" means black described by mixing 3 pigments of Y, M, C by equal amount, as compared with black described in a single pigment of K.

(3-3-1) First, a 4-dimensional color solid is reduced into a 3-dimensional color solid having 12 sides with black constant at K %, as shown in FIG. 7, by calculating 12 sides with constant K % dot-area percentage of black to be printed for the last, from 12 quadrilaterals shown in FIG. 7, using the above-mentioned virtual 2-dimensional color calculating and estimating method in item (3-2) above.

(a) Side 1, with black constant at K % and cyan variable, is calculated from a quadrilateral of K, C, CK, and KC sides.

(b) Side 2, with black constant at K % and magenta variable, is calculated from a quadrilateral of K, M, MK, and KM sides.

(c) Side 3, with black constant at K % and yellow variable, is calculated from a quadrilateral of K, Y, YK, and KY sides.

(d) Side 4, with black constant at K %, cyan constant at 100% and magenta variable, is calculated from a quadrilateral of CK, CM, MCK, and CKM sides.

(e) Side 5, with black constant at K %, magenta constant at 100% and cyan variable, is calculated from a quadrilateral of MK, MC, MCK, and MKC sides.

(f) Side 6, with black constant at K %, cyan constant at 100% and yellow variable, is calculated from a quadrilateral of CK, CY, YCK, and CKY sides.

(g) Side 7, with black constant at K %, magenta constant at 100%, cyan constant at 100% and yellow variable, is calculated from a quadrilateral of MCK, MCY, YMCK, and MCKY sides.

(h) Side 8, with black constant at K %, magenta constant at 100% and yellow variable, is calculated from a quadrilateral of MK, MY, YMK, and MKY sides.

(i) Side 9, with black constant at K %, yellow constant at 100% and cyan variable, is calculated from a quadrilateral of YK, YC, YCK, and YKC sides.

(j) Side 10, with black constant at K %, cyan constant at 100%, yellow constant at 100% and magenta variable, is calculated from a quadrilateral of YCK, YCM, YMCK, and YCKM sides.

(k) Side 11, with black constant at K %, magenta constant at 100%, yellow constant at 100% and cyan variable, is calculated from a quadrilateral of YMK, YMC, YMCK, and YMKC sides.

(l) Side 12, with black constant at K %, yellow constant at 100% and magenta variable, is calculated from a quadrilateral of YK, YM, YMK, and YKM sides.

(3-3-2) Then, the 3-dimensional color solid is reduced into a 2-dimensional color plane (virtual 2-dimensional plane) having 4 sides with black constant at K % and cyan constat at C %, as shown in FIGS. 7 and 8, by calculating 4 sides with constant C % dot-area percentage of cyan to be printed for the third, from 4 quadrilaterals described later, using the above-mentioned virtual 2-dimensional color calculating and estimating method in item (3-2) above. Namely, the sides with black constant at K % and cyan constant at C % are individually calculated so that a single quadrilateral (2-dimensional color plane) is obtained which represents a color space for the combination of magenta of arbitrary M % and yellow of arbitrary Y %.

(a) Side ① representing a yellow gradation is calculated from a quadrilateral of the above calculated four sides 1, 6, 9 and 3.

(b) Side ② having yellow constant at 100% and representing a magenta gradation is calculated from a quadrilateral of the above calculated four sides 9, 10, 11 and 12.

(c) Side ③ having magenta constant at 100% and representing a yellow gradation is calculated from a quadrilateral of the above calculated four sides 5, 8, 11 and 7.

(d) Side ④ representing a magenta gradation is calculated from a quadrilateral of the above calculated four sides 1, 4, 5 and 2.

FIG. 8 is a diagram showing a virtual 2-dimensional plane obtained by slicing, by C % of cyan, a 3-dimensional color solid of three colors Y, M, C with black constant at 0%.

(3-3-3) The spectral reflectivity corresponding a desired color signal (K, C, M, Y; target color) is calculated and estimated from the quadrilateral of the above calculated four sides ①–④, using the virtual 2-cimensional color calculating and estimating method described in (item (3-2) above.

(3-3-4) The spectral reflectivities for 1-dimensional color are calculated and estimated from the sides K, C, M and Y, using the virtual 1-dimensional color calculating and estimating method described in item (3-1) above.

(3-3-5) The spectral reflectivities for 2-dimensional color are calculated and estimated using the virtual 2-dimensional color calculating and estimating method described in item (3-2) above.

(3-3-6) The spectral reflectivities for 3-dimensional color are calculated and estimated by composing a 3-dimensional color solid of only the sides of K % of black as shown in FIG. 8 and by carrying out the above-mentioned item (3-3-2) and following processes.

After the spectral reflectivities have been calculated using the above-mentioned formulae (4), (5) (6-1) through (6-3) and (7-1), (7-2), and the calculated values have been substituted in the formula (11), the coefficients $\alpha$, $\beta$, $\gamma$ and coefficients $\xi$, $\eta$ calculated using the formulae (1) through (3) will become unable to use for inaccuracy. Consequently, after then, calculation of the spectral reflectivities for newly calculated sides is performed using the formula (8).

(4) The spectral reflectivity calculating section 46 of the present embodiment performs a process called "matching process", as a demand arises, in the following manner. This process is performed only when the spectral reflectivity for a combination of 4 color pigments set to particular dot-area percentages (Y, M, C, K) has to be matched with a particular value (if there is any data with which the reflectivity is to be matched). Accordingly, if it is unnecessary to match the reflectivity with such particular value (if there is no data with which the reflectivity is to be matched) this process should not be performed.

This process is applied to the case using the formulae (10-1) through (10-4) as the weighting coefficient $w_i$ (i=1, 2, 3, 4) in the virtual 2-dimensional color calculating and estimating method described in item (3-2) above. The process will now be described.

(4-1) The to-be-matched value of a color signal and the to-be-matched spectral reflectivity are defined as follows:

① The to-be-matched color signal . . . ($K_m$, $C_m$, $M_m$, $Y_m$) m=1, 2, . . . , M.

② The to-be-matched spectral reflectivity . . . $S_m(\lambda)$, m=1, 2, . . . , M.

(4-2) This process is performed as follows.

(4-2-1) If the to-be-matched color signal is a 1-dimensional color, it suffices to perform the method described in item (3-1) by adding the to-be-matched spectral relativity $S_m(\lambda)$ to the spectral reflectivities for N color chips used in estimation in the virtual 1-dimensional color calculating and estimating method described in item (3-1) above. This process is basically identical with the method described in item (3-1) above, except the increase in number of pieces of data.

(4-2-2) The to-be-matched color signal is 2-, 3- or 4-dimensional color, the following process (a) through (d) are performed:

(a) The following data-matching process is performed only when finally calculating the spectral reflectivity, by the above formula (11).

(b) The length between the to-be-matched color signal $(K_m, C_m, M_m, Y_m)$ and the previously given color signal is defined by the following formula (12).

$$l_{m+4} = \sqrt{(K_m - K)^2 + (C_m - C)^2 + (M_m - M)^2 + (Y_m - Y)^2} \quad (12)$$

$$m = 1, 2, \ldots, M$$

(c) A weighting coefficient $w_k$ corresponding to the thus defined length $l_{m+4}$ is obtained by the following formula (13).

$$w_k = \frac{l_k^{-1}}{\sum_{i=1}^{4} l_i^{-1} + \sum_{i=5}^{M+4} l_i^{-1}} \quad (k = 1, 2, \ldots, M+4) \quad (13)$$

(d) The spectral reflectivity $S_{x,y}(\lambda)$ is calculated from the calculated weighting coefficient $w_k$ and the to-be-matched spectral reflectivity $S_m(\lambda)$, by the following formula (14). In the formula (12), if $l_{m+4}=0$ (i.e., if the to-be-matched color signal $K_m, C_m, M_m, Y_m$ and the previously given color signal K, C, M, Y coincide with each other), a spectral reflectivity $S_{x,y}(\lambda)$ to be obtained is assumed as the to-be-matched spectral reflectivity $S_m(\lambda)$ as indicated by the following formula (15).

$$S_{x,y}(\lambda) = w_1 \cdot S_{x,0}(\lambda) + w_2 \cdot S_{0,y}(\lambda) + w_3 \cdot S_{x,100}(\lambda) + w_4 \cdot S_{100,y}(\lambda) + w_5 \cdot S_1(\lambda) + w_6 \cdot S_2(\lambda) + \ldots + w_{m+4} \cdot S_m(\lambda) \quad (14)$$

$$S_{x,y}(\lambda) = S_m(\lambda) \ (m=1,2,\ldots, \text{or } M) \quad (15)$$

Thus by performing the matching process, it is possible to designate a particular spectral reflectivity for the combination of specified color signals (dot-area percentages). Accordingly, if a color likely to be matched due to the in-page error is previously measured, it is possible to forcibly calculate a predetermined spectral reflectivity for that color and to perform a highly precise estimation as the in-page error is negligible.

(5) After the spectral reflectivities have been calculated in the above-mentioned manner by the spectral reflectivity calculating section 46, the converting section 48 of the present embodiment converts the calculated spectral reflectivities into color signals for the monitor 36 so that color display is performed on the monitor 36 based on the color signals. In the converting section 48, the method of converting the calculated spectral reflectivities into CIEXYZ (1931) and sRGB should be in accordance with the following International Standards:

(a) Conversion from the spectral reflectivity into CIEXYZ (1931)
    . . . CIE15.2—Colorimetry (b) Conversion from CIEXYZ(1931) into sRGB
    . . . IEC61966 Part 2.0 (sRGB); 1999

(c) Conversion from CIEXYZ(1931) into CRT output signal
    . . . IEC61966 Part 5 (CRT); 20XX (d) Conversion from CIEXYZ(1931) into LCD outputsignal
    . . . IEC61966 Part 6 (LCD); 20XX (e) Conversion from CIEXYZ(1931) into PDP outputsignal
    . . . IEC61966 Part 7 (PDP); 20XX Now, the procedure flow of th-e present embodiment to reproduce the color printer output, which has been described in items (1) through (5) above, will be described hereinbelow referring to the flowchart (steps S11–S26) of FIG. 13.

First, the discriminating section 42 discriminates whether or not color information to be reproduced on the monitor 36 according to the process described in item (1) above is for the color printer, based on the spectral reflectivities measured for a plurality of (352 in the present embodiment) previously given color chips (step S11). If the color information is not for the color printer (NO route from step S12) the procedure is terminated. Meanwhile if the color information is for the color printer (YES route from step S12), the coefficient calculating section 44 calculates the coefficients $\alpha_i, \beta_i, \gamma_i, \xi_i, \eta_i$ according to the process described in item (2) above (step S13)

Then the spectral reflectivity calculating section 46 calculates and estimates spectral reflectivities corresponding to the number of dimensions of color in accordance with the process described in item (3) above (steps S14–S24). In this instance, the number of dimensions of the color, of which spectral reflectivity should be estimated, is determined (step S14).

For 1-dimensional color ("1-dimensional color" route from step S14), the spectral reflectivity calculating section 46 calculates a spectral reflectivity in accordance with the method described in item (3-1) above (step S15).

For 2-dimensional color ("2-dimensional color" route from step S14), the spectral reflectivity calculating section 46 discriminates whether or not the spectral reflectivity must be matched with a particular value (step S16), and, if the result of discrimination is negative (NO route from step S16), then the spectral reflectivity calculating section 46 calculates and estimates the spectral reflectivity in accordance with the method described in item (3-2) above (step S17). If it is positive(YES route from step S16), then the spectral reflectivity calculating section 46 calculates and estimates the spectral reflectivity in accordance with the method described in item (4) above (step S18).

For 3- or 4-dimensional color ("3-, 4-dimentional color" route from step S14), the spectral reflectivity calculating section 46 reduces, for 4-dimensional color, a 4-dimensional color solid into a 3-dimensional color solid with black being constant in the procedure described in item (3-3-1) above (step S19) and further reduces (slices) the 3-dimensional color solid into a 2-dimensional color plane with cyan being constant in the procedure described in item (3-3-2) above (step S20). For 3-dimensional color, only the reduction process of step S21 is performed.

Upon reduction of number of dimensions to the 2-dimensional color plane, the spectral reflectivity calculating section 46 discriminates whether or not the spectral reflectivity must be matched with a particular value, likewise steps S16–S18, (step S21) and, if the result of discrimination is negative (NO route from step S21), then the spectral reflectivity calculating section 46 calculates and estimates the spectral reflectivity in accordance with the method described in item (3-2) above (step S22). If it is positive (YES route from step S21), then the spectral reflectivity calculating section 46 calculates and estimates the spectral reflectivity in accordance with the method described in item (4) above (step S23).

Subsequently, the converting section 48 first converts the spectral reflectivity into CIEXYZ (1931) as by the method described in (a) of item (5) above (step S24) and then converts CIEXYZ (1931) into sRGB as by the method described in (b) in item (5) above (step S25) so that color display of a desired color printer output is made on the monitor 36 (step S26).

The result of comparison in precision between the actually measured spectral reflectivity values and the estimated (spectral reflectivity) values according to the present embodiment is shown in Table 2 and Table 3 below. Tables 2 and 3 show the result of estimation (average and maximum values of $\Delta E94$, and positions of the maximum values (%)) by the present method on the spectral reflectivities for every combination of 2 colors (CK, MC, MK, YC, YK, YM) among cyan (C), magenta (M), yellow (Y), black (K).

Since each side has color signals (color chips) in 11 steps, there exist 11×11=121 color chips of a single combination, e.g. CK. Consequently an arbitrary spectral reflectivity for 2-dimensional color CK was estimated using the reflectivities for 40 color chips on 4 sides surrounding the color position corresponding to the spectral reflectivity to be estimated.

Table 2 shows the result of estimation precision when the weighting coefficients $w_i$ were calculated by the formulae (9-1) through (9-4). Likewise Table 3 shows the result of estimation precision when the weighting coefficients were calculated by the formulae (10-1) through (10-4).

As is apparent from Tables 2 and 3, either in the case using the formulae (9-1) through (9-4) or in the case using the formulae (10-1) through (10-4), estimation precision is substantially the same. It turns out also from the average and maximum values of $\Delta E94$ that estimation precision is excellent.

TABLE 2

|  | CK | MC | MK | YC | YK | YM | Integrated |
|---|---|---|---|---|---|---|---|
| Average ($\Delta E94$) | 1.21 | 1.16 | 0.90 | 1.28 | 1.44 | 1.05 | 1.17 |
| Maximum ($\Delta E94$) | 3.19 | 3.42 | 3.20 | 3.39 | 5.66 | 3.17 | 5.66 |
| Maximum position | (30, 50) | (50, 90) | (30, 60) | (20, 40) | (30, 40) | (30, 60) | (Y30, K60) |

TABLE 3

|  | CK | MC | MK | YC | YK | YM | Integrated |
|---|---|---|---|---|---|---|---|
| Average ($\Delta E94$) | 1.16 | 1.16 | 0.92 | 1.18 | 1.44 | 1.07 | 1.16 |
| Maximum ($\Delta E94$) | 3.22 | 3.72 | 3.25 | 3.05 | 5.68 | 3.16 | 5.68 |
| Maximum position | (70, 20) | (50, 70) | (30, 60) | (20, 40) | (30, 40) | (30, 50) | (Y30, K40) |

According to the color reproducing method of the present embodiment, the following advantageous results can be achieved.

(I) By considering the optical effect indicated by arrow A3 in FIG. 2, which was not considered in Neugebauer's formula, as the coefficient $\beta$ relating to the spectral reflectivity $S_{50\%}(\lambda)$, it is possible to calculate and estimate the spectral reflectivity for the virtual 1-dimensional color also depicted in FIG. 9 with precision. It is therefore possible to match the real color to be actually outputted by the color printer with the object color to be reproduced on the monitor 36.

(II) It is possible to calculate and estimate not only the spectral reflectivity with dot-area percentage of black being 100% but also the spectral reflectivity for black gradation (1-dimensional color of black), as shown in FIG. 11, with improved precision, thus calculating dotgains, which could not be estimated by the conventional method.

(III) Since a particular spectral reflectivity for combination of particular color signals can be designated by performing the matching process described in item (4) above, it is possible to forcibly calculate a desired spectral reflectivity for a given color by previously measuring colors each of which would be out of match due to the in-page error. It is therefore possible to improve the estimation precision of spectral reflectivities, irrespective of the in-page error.

(IV) By differentiating the color printer output from the printed material by the function of the discriminating section 42, it is possible to realize highly precise color reproduction limited to the color printer output.

(V) It is possible to estimate color values (spectral reflectivities) by less than half number of color chips (352 colors in the present embodiment) with very high precision as compared with 928 color chips (ISO12642, JIS X 9202) and 728 color chips used in the conventional art (see FIGS. 9 through 11 and Tables 2 and 3). Since the number of color chips needed for estimation can thus be reduced, it is possible to make the in-page error also smaller as the color area becomes smaller with the decreased number of color chips, thereby avoiding the impairing of estimation precision due to the in-page error. Further, according to the present invention, if a plurality of color chips to be previously designated do not exist on all sides ($n \cdot 2^{n-1}$) composing an n-dimensional color solid, it is possible to theoretically prove that the estimation precision for spectral reflectivities would be poor.

(VI) Using the method of the present invention, it is possible to determine the amount of UCR (under color removal) with high precision by making confirmation on the monitor 36 without doing try and error in a color printer, and also to facilitate confirming on the monitor as to compression and expansion of color areas as well as hiding and seeing of colors.

The present invention should by no means be limited to the illustrated embodiment, and various other changes or modifications maybe suggested without aparting from the gist of the present inventive concept.

For example, in the foregoing embodiment, the combination of four color pigments (Y, M, C, K) was used; but the present invention should by no means be limited to this number of colors.

What is claimed is:

1. A method of reproducing on a monitor the output of a color printer which makes color printing using color pigments of n colors (n is a natural number of 2 or larger) including black in combination, with black being printed as a final stage of the color printing, said method comprising the steps of:

(a) calculating at least one coefficient to be used in calculating a particular spectral reflectivity corresponding to an arbitrary dot-area percentage, based on spectral reflectivities measured for a plurality of previously designated color chips (including more than 2 standard color chips of different dot-area percentages on each side) on $n \cdot 2^{n-1}$ sides of an n-dimensional color solid;

(b) calculating said particular spectral reflectivity corresponding to said arbitrary dot-area percentage based on said coefficient calculated in said coefficient calculating step and the plural spectral reflectivities measured for the plural color chips; and (c) converting said particular spectral reflectivity calculated in said spectral reflectivity calculating step into a color signal for the monitor;

wherein in said coefficient calculating step, more than two coefficients representing color characteristics of the output of the color printer and respectively relating to the plural spectral reflectivities of the more than two standards color chips are calculated, based on the plural spectral reflectivities measured for the plural color chips, for one of said $n \cdot 2^{n-1}$ sides which is neither a side where the dot-area percentage of black is 100% nor a side representing a black graduation, and wherein in said spectral reflectivity calculating step, a particular spectral reflectivity corresponding to arbitrary dot-area percentage for said side which is neither said side where the dot-area percentage of black is 100% nor said side representing a black gradation is calculated based on said more than two coefficients calculated in said coefficient calculating step, and a particular spectral reflectivity corresponding to an arbitrary dot-area percentage on said side where the dot-area percentage of black is 100% is calculated based on the plural spectral reflectivities measured for the plural color chips.

2. A color-printer-output reproducing method according to claim 1, further comprising a step of discriminating whether or not color information to be reproduced on the monitor is that for the color printer, based on the plural spectral reflectivities measured for the plural color chips, wherein if the result of said discrimination is positive in said discriminating step, said coefficient calculating step, said spectral reflectivity calculating step and said converting step are carried out.

3. A color-printing-output reproducing method according to claim 2, wherein in said discriminating step, a standard deviation of the plural spectral reflectivities measured for the plural color chips on said side where the dot-area percentage of black is 100% is calculated and then the calculated standard deviation is compared with a predetermined value, whereupon if said calculated standard deviation is equal to or less than said predetermined value, said color information to be reproduced on the monitor is judged to be for the color printer.

4. A color-printer-output reproducing method according to claim 1, wherein in said coefficient calculating step, said more than two coefficients are calculated by the least squares method based on the plural spectral reflectivities measured for the plural color chips.

5. A color-printer-output reproducing method according to claim 1, wherein in said coefficient calculating step, two coefficients $\xi$, $\eta$ representing dotgains, which relate respectively to the spectral reflectivities of two reference color chips when the corresponding dot-area percentages are 0% and 100%, are calculated for every side except the side where the dot-area percentage is 100% and the side representing a black gradation, based on the plural spectral reflectivities measured for the plural color chips, and in said spectral reflectivity calculating step, said two coefficients $\xi$, $\eta$ calculated in said coefficient calculating step are used in calculating said particular spectral reflectivity corresponding to said arbitrary dot-area percentage.

6. A color-printer-output reproducing method according to claim 1, wherein in said coefficient calculating step, the plural spectral reflectivities measured for the plural color chips on the side representing a black gradation are averaged throughout at least part of a visible wavelength range, and two coefficients $\xi$, $\eta$ representing dotgains are calculated based on an average value of said plural spectral reflectivities as the result of said averaging, and in said spectral reflectivity calculating step, said particular spectral reflectivity corresponding to said arbitrary dot-area percentage on the side representing a black gradation is calculated, based on said two coefficients $\xi$, $\eta$ calculated in said coefficient calculating step.

7. A color-printer-output reproducing method according to claim 1, wherein in said spectral reflectivity calculating step, a constant value to be calculated or determined based on the plural spectral reflectivities measured for the plural color chips is outputted as said particular spectral reflectivity corresponding to said arbitrary dot-area percentage on the side where the dot-area percentage is 100%.

8. A color-printer-output reproducing method according to claim 5, wherein in said spectral reflectivity calculating step, an (n−1)-dimensional color solid, in which the dot-area percentage of an n-th color pigment to be printed by the color printer is constant, is calculated from said n-dimensional color solid, an (n−2)-dimensional color solid, in which the dot-area percentage of an n-th color pigment to be printed by the color printer is constant, is calculated from said (n−1)-dimensional color solid, a 2-dimensional color plane, in which the dot-area percentage of 3rd to n-th color pigments is constant, is calculated by repeating a reduction process of the same number of dimensions as described above, and finally, a spectral reflectivity when said color pigments of n colors set to arbitrary dot-area percentages are combined, is calculated, using said two coefficients $\xi$, $\eta$, from said 2-dimensional color plane.

9. A color-printer-output reproducing method according to claim 6, wherein in said spectral reflectivity calculating step, an (n−1)-dimensional color solid, in which the dot-area percentage of an n-th color pigment to be printed by the color printer is constant, is calculated from said n-dimensional color solid, an (n−2)-dimensional color solid, in which the dot-area percentage of an n-th color pigment to be printed by the color printer is constant, is calculated from said (n−1)-dimensional color solid, a 2-dimensional color plane, in which the dot-area percentage of 3rd to n-th color pigments is constant, is calculated by repeating a reduction process of the same number of dimensions as described above, and finally, a spectral reflectivity when said color pigments of n colors set to arbitrary dot-area percentages are combined, is calculated, using said two coefficients $\xi$, $\eta$, from said 2-dimensional color plane.

10. A color-printer-output reproducing method according to claim 8, wherein in order to designate a specified value for said spectral reflectivity when said color pigments of n colors set to specified dot-area percentages are combined, a weighting coefficient is calculated based on the inverse number of a distance between a color signal imparting said specified dot-area percentage and a color signal imparting said arbitrary dot-area percentage, a value obtained by multiplying said specified value with said weighting coefficient is added to said finally calculated spectral reflectivity, and if said distance is 0 (zero), said specified value is outputted as said finally calculated spectral reflectivity.

11. A color-printer-output reproducing method according to claim 9, wherein in order to designate a specified value for said spectral reflectivity when said color pigments of n colors set to specified dot-area percentages are combined, a weighting coefficient is calculated based on the inverse number of a distance between a color signal imparting said specified dot-area percentage and a color signal imparting said arbitrary dot-area percentage, a value obtained by multiplying said specified value with said weighting coefficient is added to said finally calculated spectral reflectivity, and if said distance is 0 (zero), said specified value is outputted as said finally calculated spectral reflectivity.

12. An apparatus for reproducing on a monitor the output of a color printer which makes color printing using color pigments of n colors (n is a natural number of 2 or larger) including black in combination with black being printed as a final stage of the printing, said method comprising:

(a) a coefficient calculating section for calculating at least one coefficient to be used in calculating a particular spectral reflectivity corresponding to an arbitrary dot-area percentage, based on spectral reflectivities measured for a plurality of previously designated color chips (including more than 2 reference color chips of different dot-area percentages on each side) on $n \cdot 2^{n-1}$ sides of an n-dimensional color solid;

(b) a spectral reflectivity calculating section for calculating said particular spectral reflectivity corresponding to said arbitrary dot-area percentage based on said coefficient calculated in said coefficient calculating section and the plural spectral reflectivities measured for the plural color chips; and (c) a converting section for converting said particular spectral reflectivity calculated in said spectral reflectivity calculating section into a color signal for the monitor;

said coefficient calculating section being operable to calculate more than two coefficients representing color characteristics of the output of the color printer and respectively relating to the plural spectral reflectivities of the more than two reference color chips, based on the plural spectral reflectivities measured for the plural color chips, for one of said $n \cdot 2^{n-1}$ sides which is neither a side where the dot-area percentage of black is 100% nor a side representing a black gradation;

said spectral reflectivity calculating section being operable to calculate a particular spectral reflectivity corresponding to arbitrary dot-area percentage for said side which is neither said side where the dot-area percentage of black is 100% nor said side representing a black gradation, based on said more than two coefficients calculated in said coefficient calculating section, and being also operable to calculate a particular spectral reflectivity corresponding to an arbitrary dot-area percentage on said side where the dot-area percentage of black is 100% is calculated based on the plural spectral reflectivities measured for the plural color chips.

13. A color-printer-output reproducing apparatus according to claim 12, further comprising a discriminating section for discriminating whether or not color information to be reproduced on the monitor is that for the color printer, based on the plural spectral reflectivities measured for the plural color chips, wherein if the result of said discrimination is positive in said discriminating section, the operations of said coefficient calculating section, said spectral reflectivity calculating section and said converting section are carried out.

14. A computer-readable recording medium storing a color-printer-output reproducing program which instructs a computer to execute a function of reproducing on a monitor the output of a color printer which makes color printing using color pigments of n colors (n is a natural number of 2 or larger) including black in combination with black being printed as a final stage of the printing, said color-printer-output reproducing program instructing the computer to function as the following:

(a) a coefficient calculating section for calculating at least one coefficient to be used in calculating a particular spectral reflectivity corresponding to an arbitrary dot-area percentage, based on spectral reflectivities measured for a plurality of previously designated color chips (including more than 2 reference color chips of different dot-area percentages on each side) on $n \cdot 2^{n-1}$ sides of an n-dimensional color solid;

(b) a spectral reflectivity calculating section for calculating said particular spectral reflectivity corresponding to said arbitrary dot-area percentage based on said coefficient calculated in said coefficient calculating section and the plural spectral reflectivities measured for the plural color chips; and (c) a converting section for converting said particular spectral reflectivity calculated in said spectral reflectivity calculating section into a color signal for the monitor;

said coefficient calculating section being operable to calculate more than two coefficients representing color characteristics of the output of the color printer and respectively relating to the plural spectral reflectivities of the more than two reference color chips, based on the plural spectral reflectivities measured for the plural color chips, for one of said $n \cdot 2^{n-1}$ sides which is neither a side where the dot-area percentage of black is 100% nor a side representing a black gradation;

said spectral reflectivity calculating section being operable to calculate a particular spectral reflectivity corresponding to arbitrary dot-area percentage for said side which is neither said side where the dot-area percentage of black is 100% nor said side representing a black gradation, based on said more than two coefficients calculated in said coefficient calculating section, and being also operable to calculate a particular spectral reflectivity corresponding to an arbitrary dot-area percentage on said side where the dot-area percentage of black is 100% is calculated based on the plural spectral reflectivities measured for the plural color chips.

15. A computer-readable recording medium according to claim 14, wherein said color-printer-output reproducing program further instructs the computer to function as a discriminating section for discriminating whether or not color information to be reproduced on the monitor is that for the color printer, based on the plural spectral reflectivities measured for the plural color chips, and wherein if the result of said discrimination is positive in said discriminating section, said color-printer-output reproducing program instructs the computer to function as said coefficient calculating section, said spectral reflectivity calculating section and said converting section.

* * * * *